(12) United States Patent
Hussain et al.

(10) Patent No.: US 12,265,834 B1
(45) Date of Patent: Apr. 1, 2025

(54) CLOUD-BASED SYSTEM FOR SCHEDULING AND RECEIVING A TEXTUAL ALERT MESSAGE AND RECEIVING AN INTELLIGENCE DASHBOARD

(71) Applicant: Algomus, Inc., Troy, MI (US)

(72) Inventors: Amjad Hussain, Bloomfield Hills, MI (US); Ali Farooq, Lahore (PK); Imran Maqsood, Lahore (PK); Adeel Hafeez, Lahore (PK); Safee Saadat, Lahore (PK); Amanda Duellman, White Bear Lake, MN (US)

(73) Assignee: Algomus, Inc., Troy, MI (US)

( * ) Notice: Subject to any disclaimer, the term of this patent is extended or adjusted under 35 U.S.C. 154(b) by 65 days.

(21) Appl. No.: 18/100,128

(22) Filed: Jan. 23, 2023

(51) Int. Cl.
   *G06F 9/451* (2018.01)
   *G06F 16/904* (2019.01)

(52) U.S. Cl.
   CPC ............ *G06F 9/451* (2018.02); *G06F 16/904* (2019.01)

(58) Field of Classification Search
   CPC .............................. G06F 9/451; G06F 16/904
   See application file for complete search history.

(56) References Cited

U.S. PATENT DOCUMENTS

| | | | |
|---|---|---|---|
| 2004/0158371 A1* | 8/2004 | Iggulden | B60R 16/0231 379/102.03 |
| 2012/0016678 A1* | 1/2012 | Gruber | G06F 16/9537 704/E21.001 |
| 2017/0329466 A1* | 11/2017 | Krenkler | G06F 9/453 |
| 2020/0076750 A1* | 3/2020 | Krishnaswamy | H04L 51/212 |

OTHER PUBLICATIONS

Kore.ai Documentation online, section "Set Up a Smart Alert" captured by Internet Archive WayBack Machine Dec. 5, 2022, https://developer.kore.ai/docs/bots/how-tos/how-to-schedule-an-alert/, 1 page. (Year: 2002).*

* cited by examiner

*Primary Examiner* — K C Chen
(74) *Attorney, Agent, or Firm* — Carlson, Gaskey & Olds, P.C.

(57) ABSTRACT

A cloud-based system for scheduling and receiving a textual alert message and receiving an intelligence dashboard is provided. The system includes a conversational web GUI that is displayed on the web browser having a text input box and a scrollable panel. The text input box receives a textual alert request having an alert parameter and a threshold number. The conversational web GUI displays on the scrollable panel in sequential vertical positions a textual alert request, textual alert words of the textual alert message, updated textual alert words of the updated textual alert message, and the intelligence dashboard on the scrollable panel that correspond to a conversation between a user and the system.

12 Claims, 21 Drawing Sheets

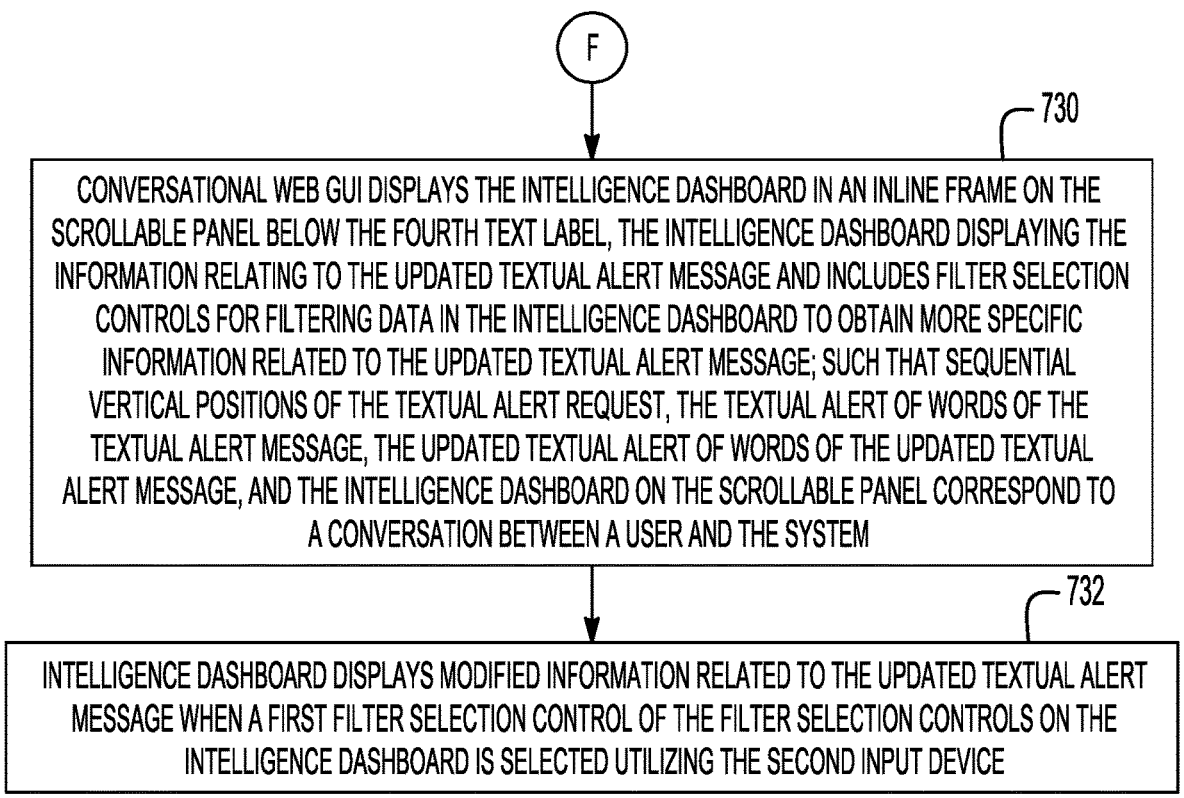
FIG. 18
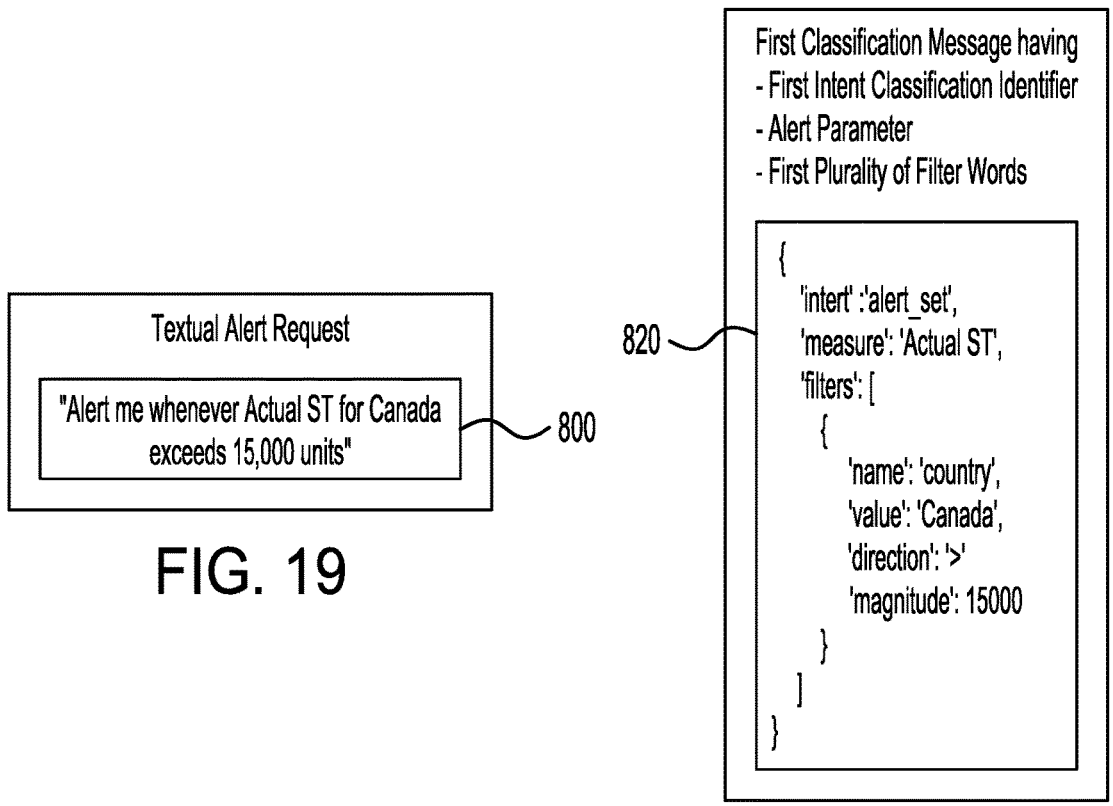
FIG. 19
FIG. 20

CLOUD-BASED SYSTEM FOR SCHEDULING AND RECEIVING A TEXTUAL ALERT MESSAGE AND RECEIVING AN INTELLIGENCE DASHBOARD

BACKGROUND

Internet-based systems have been utilized to send an alert message. However, Internet-based systems do not have a GUI with a scrollable panel that allows a user to view a textual alert request, a textual alert message, and an intelligence dashboard in a conversional style to the user. Further, the Internet systems do not obtain and display intelligence dashboards related to a textual alert request.

The inventors herein have recognized a need for an improved cloud-based system for scheduling and receiving a textual alert message associated with a textual alert request and receiving an intelligence dashboard associated therewith in a conversational format.

SUMMARY

A cloud-based system for scheduling and receiving a textual alert message and receiving an intelligence dashboard in accordance with an exemplary embodiment is provided. The cloud-based system communicates with a computer having first and second input devices, a display device, and a web browser. The cloud-based system includes a conversational web graphical user interface (GUI) being displayed on the web browser. The conversational web GUI has a text input box and a scrollable panel. The text input box receives a textual alert request having an alert parameter and a threshold number from the first input device. The conversational web GUI displays the textual alert request in a first text label on the scrollable panel, and sends the textual alert request to a virtual assistant application. The conversational web GUI displays a plurality of alert time interval icons below the first text label. The conversational web GUI receives a selected alert time interval from one of the plurality of alert time interval icons selected by the second input device, and sends an alert time interval message having the selected alert time interval to a task scheduler application which notifies the virtual assistant application that the selected alert time interval has been received. The conversational web GUI receives the textual alert message from the task scheduler application when the selected alert time interval has passed and an alert condition is satisfied. The conversational web GUI displays textual alert words from the textual alert message in an alert notification object on top of the scrollable panel below the plurality of alert time interval icons. The conversational web GUI receives an updated textual alert message with updated textual alert words and an intelligence dashboard identifier from the virtual assistant application when the alert notification object is selected utilizing the second input device. The intelligence dashboard identifier is associated with the intelligence dashboard that has information relating to the updated textual alert message. The conversational web GUI displays the updated textual alert words of the updated textual alert message in a second text label on the scrollable panel below the alert notification object. The conversational web GUI requests the intelligence dashboard from a dashboard analytics application based on the intelligence dashboard identifier. The conversational web GUI receives the intelligence dashboard from the dashboard analytics application. The conversational web GUI displays the intelligence dashboard in an inline frame on the scrollable panel below the second text label. The intelligence dashboard displays the information relating to the updated textual alert message and includes filter selection controls for filtering data in the intelligence dashboard to obtain more specific information related to the updated textual alert message, such that sequential positions of the textual alert request, the textual alert words of the textual alert message, the updated textual alert words of the updated textual alert message, and the intelligence dashboard on the scrollable panel correspond to a conversation between a user and the system.

BRIEF DESCRIPTION OF THE DRAWINGS

FIGS. 12-18 are flowcharts of a method for scheduling and receiving a textual alert message, an updated textual alert message, and an intelligence dashboard utilizing the system of FIG. 1;

FIG. 19 is a schematic of an exemplary textual alert request utilized in the cloud-based system of FIG. 2;

FIG. 20 is a schematic of an exemplary first classification message having an intent classification identifier, an alert parameter, and a first plurality of filter words utilized in the cloud-based system of FIG. 2;

DETAILED DESCRIPTION

Figure 1:
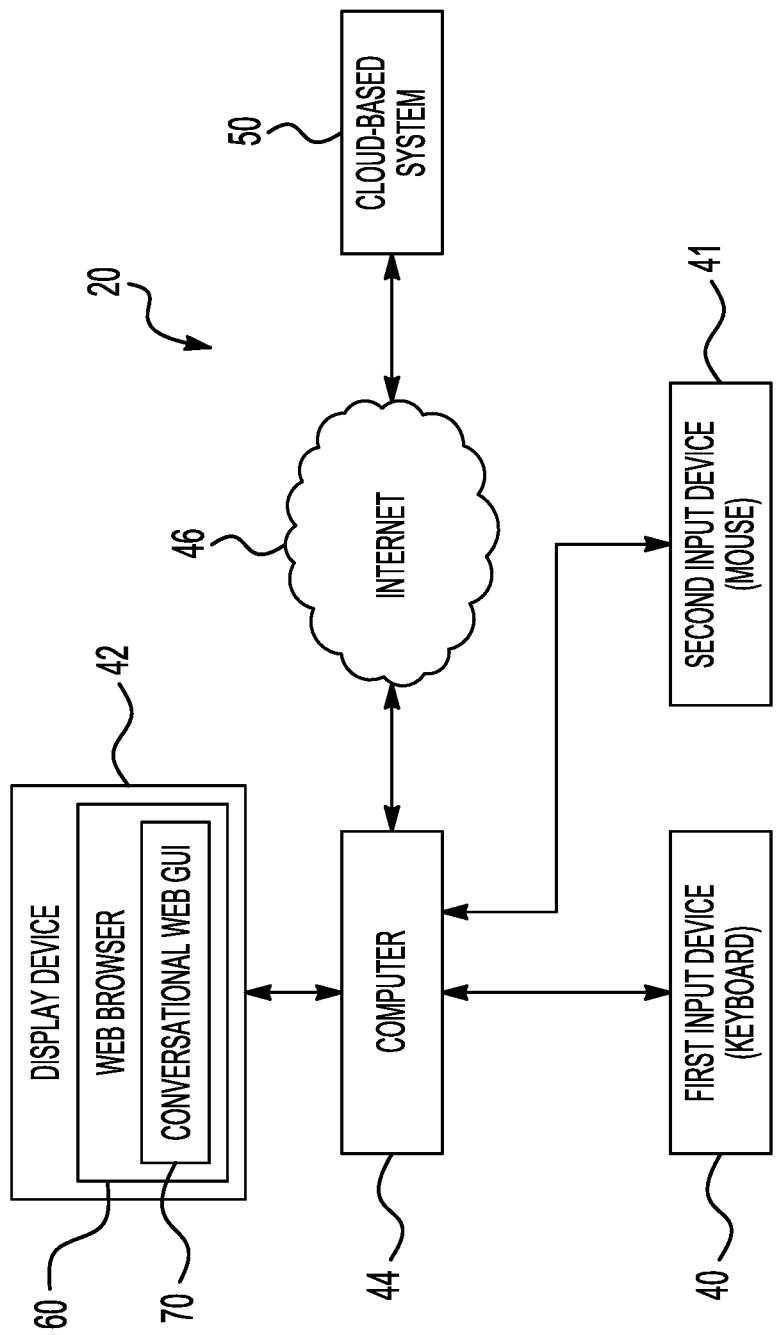
FIG. 1 is a block diagram of a system having a cloud-based system in accordance with an exemplary embodiment, a computer, first and second input devices, and a display device.

Referring to FIG. 1, a system 20 having first and second input devices 40, 41, a display device 42, a computer 44, the Internet 46, and a cloud-based system 50 in accordance with an exemplary embodiment is illustrated.

An advantage of the cloud-based system 50 is that the system 50 utilizes a conversational web GUI that obtains and displays a textual alert message in response to a textual alert request, and obtains and displays updated textual alert message and an intelligence dashboard related to the textual alert request. And sequential positions of the textual alert request, textual alert words of the textual alert message, updated textual alert words of the updated textual alert message, and the intelligence dashboard on a scrollable panel 160 correspond to a conversation between a user and the system 50.

For purposes of understanding, a few terms utilized herein will now be defined.

The term "GUI" means graphical user interface.

The term "conversational web GUI" as used herein means a GUI that displays at least a textual alert request, a textual alert message, and an intelligence dashboard in sequential vertical positions on a scrollable panel to simulate a conversation between a user and a system.

The term "text input box" means a control element of a graphical user interface that enables a user to input text information.

The term "text label" means a control element of a graphical user interface that displays text therein.

The term "inline frame" or iframe means a HTML element that loads another HTML page or application within a graphical user interface.

The term "scrollable panel" means a panel that can hold content that "flows off the page" such that a user can scroll up and down the panel to view all of the content therein. In an exemplary embodiment, the scrollable panel is a vertically scrollable panel.

The term "intelligence dashboard" means a data visualization and analysis application that displays on one panel or screen the status of important metrics, data points, and key performance indicators (KPIs) for an entity. An intelligence dashboard displays a data table, and a filter selection control that allows a user to further customize the displayed information utilizing data stored in the intelligence dashboard.

The term "application" means a software application or module.

The term "textual alert request" means a group of text words that request an alert and include at least an alert parameter, a direction word or symbol, and a threshold number. For example, the text words "Alert me whenever Actual ST for Canada exceeds 15,000 units" is a textual alert request indicating a requested alert and having an alert parameter of "Actual ST", a direction word or symbol "exceeds", and a threshold number of "15,000."

The term "textual alert message" means a group of text words that indicates an alert message generated in response to the textual alert request when the conditions in the textual alert request are met.

The term "textual alert question" means a group of text words that indicate a question that is generated to obtain updated information associated with the textual alert message. It is noted that a group of text words does not need a "?" mark therein to be a textual alert question.

The term "updated textual alert message" means a group of text words that indicates updated information associated with the textual alert message generated in response to the textual alert question.

The term "URL" means Uniform Resource Locator and is an address of a unique resource on the Web such as a webpage.

The terms "information related to the updated textual alert message" means at least a table or a graphical image indicating information or words associated with or identical to at least one word in the updated textual alert message.

The term "Actual ST" means actual sales (in units) through a specific region or time period.

The term "satisfied" means met or occurred.

The computer 44 is operably coupled to and communicates with the first and second input devices 40, 41 and the display device 42. Further, the computer 44 operably communicates with the cloud-based system 50 via the Internet 46. The display device 44 displays a web browser 60 thereon. The web browser 60 displays a conversational web GUI 70 therein that is associated with the cloud-based system 50. In an exemplary embodiment, the first input device 40 is a keyboard or a voice-recognition system, and the second input device 41 is a mouse or a voice-recognition system.

Figure 8:
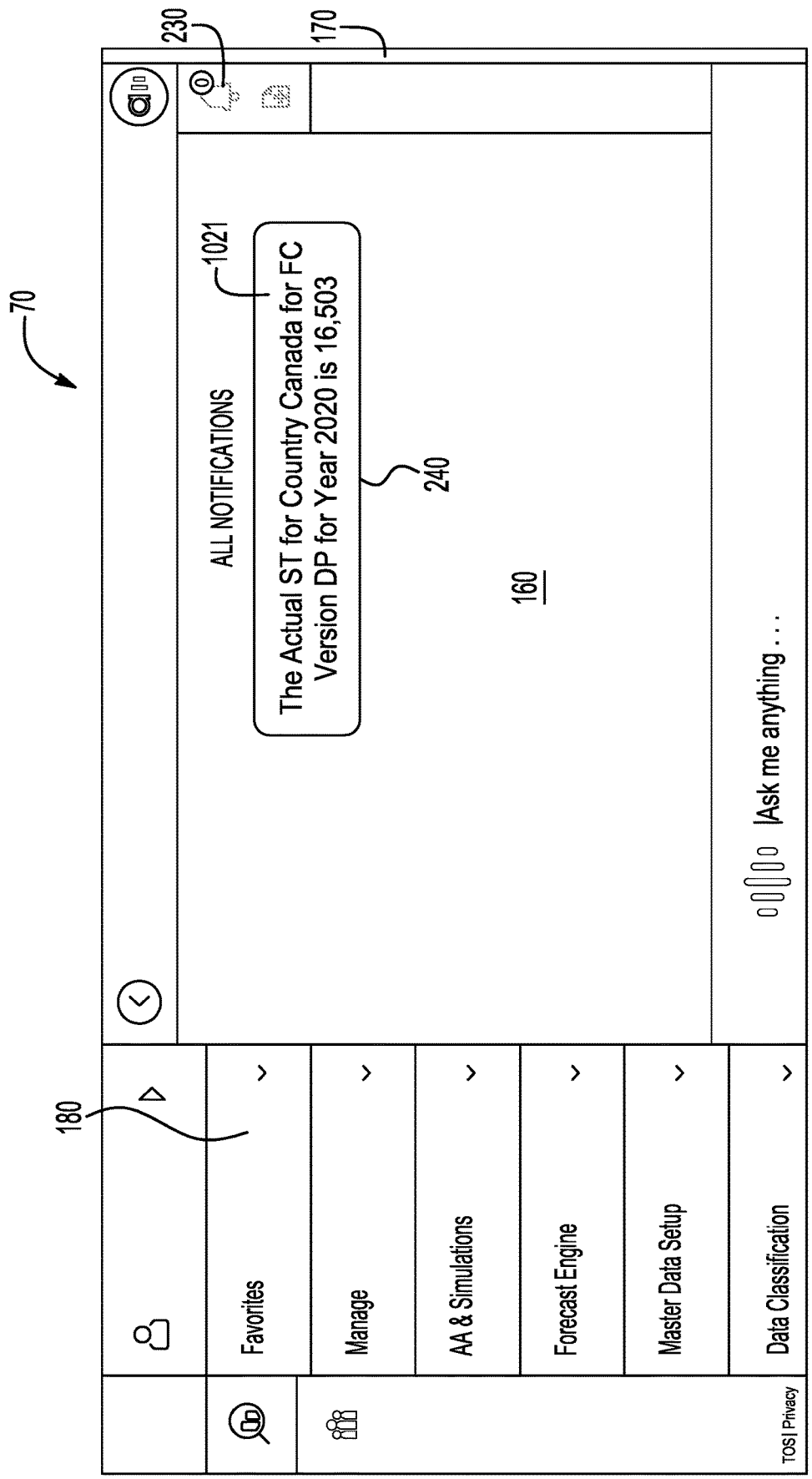
FIG. 8 is another schematic of the conversational web GUI of FIG. 3.
Figure 9:
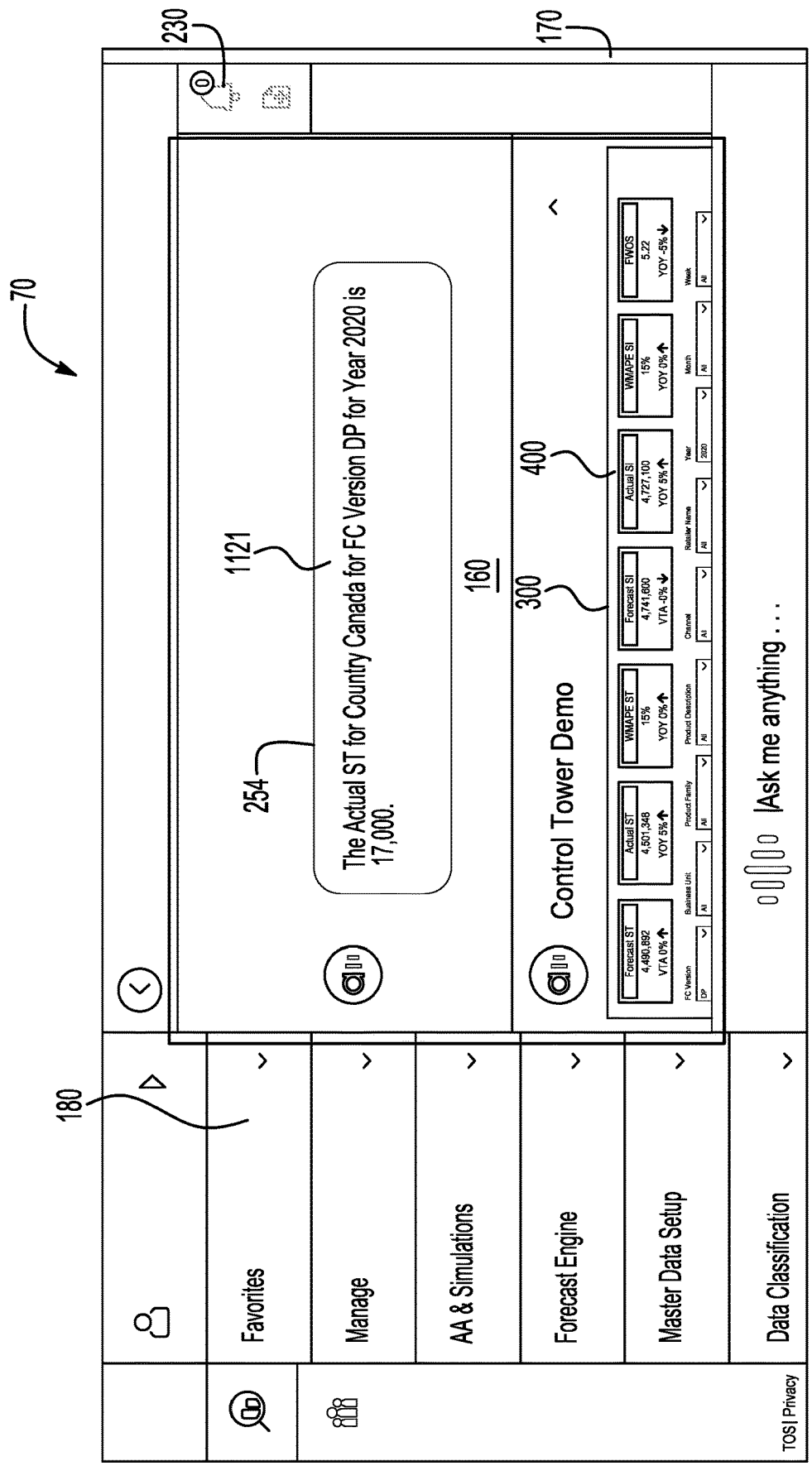
FIG. 9 is another schematic of the conversational web GUI of FIG. 3.
Figure 10:
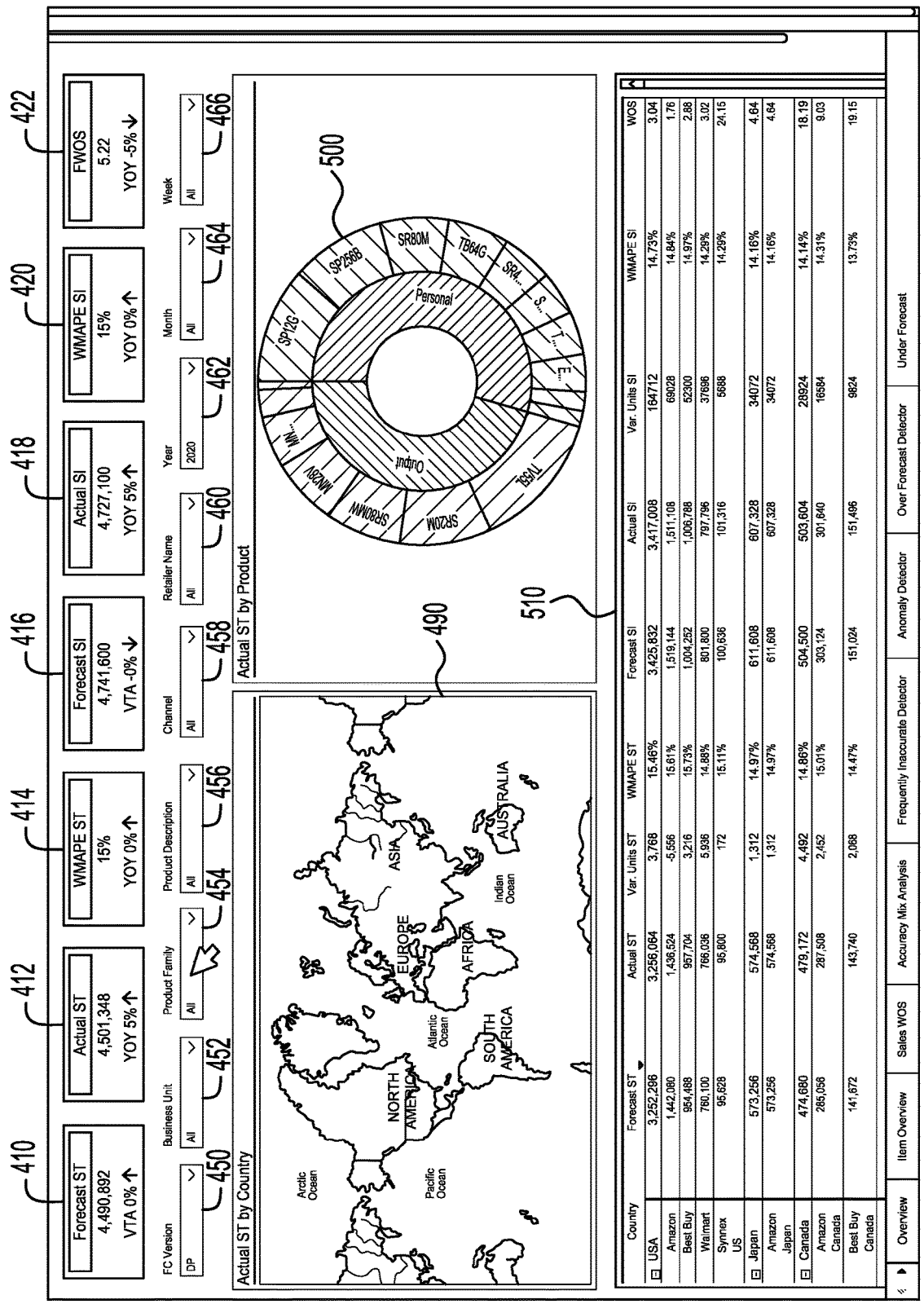
FIG. 10 is another schematic of the conversational web GUI of FIG. 3.
Figure 11:
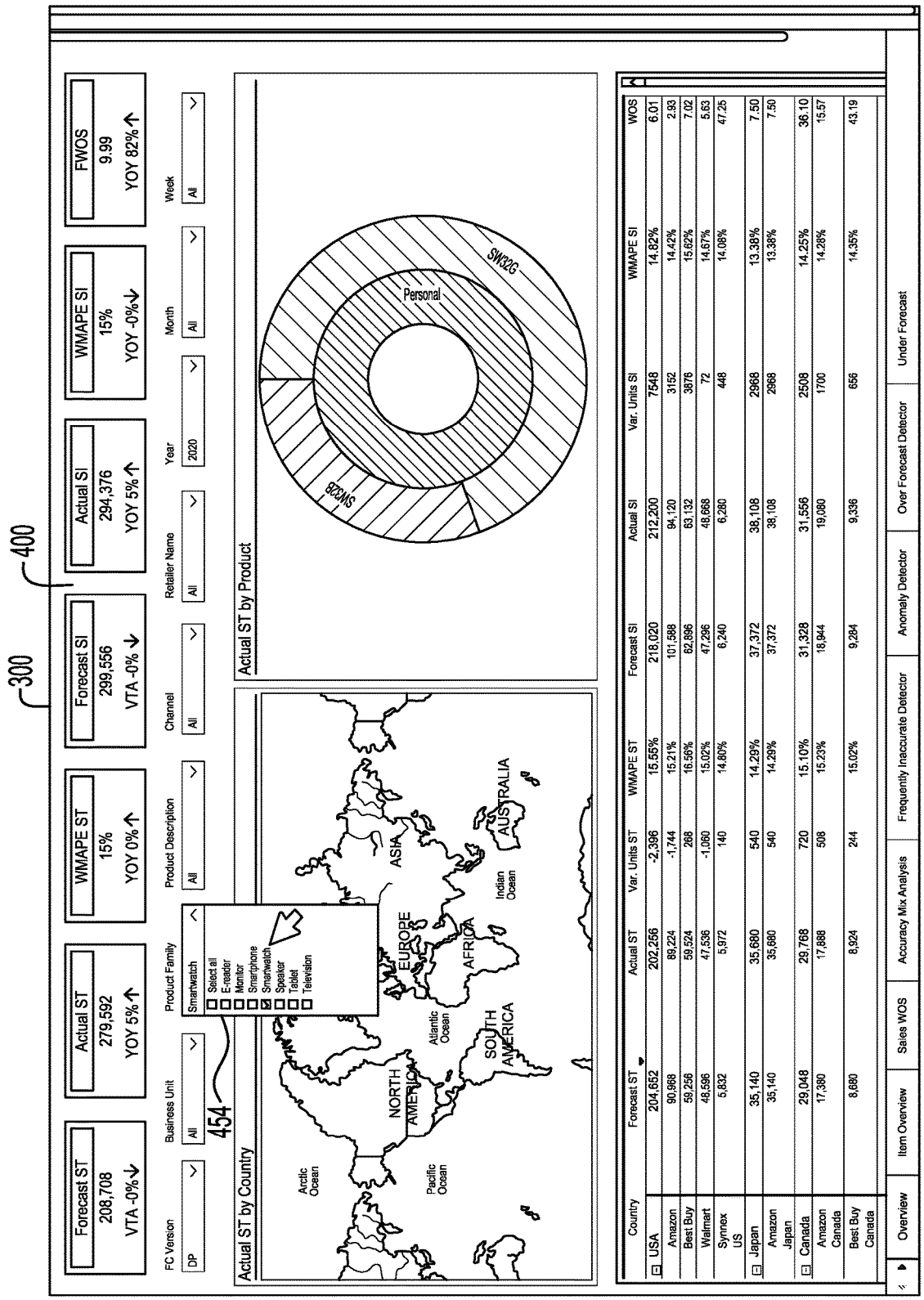
FIG. 11 is another schematic of the conversational web GUI of FIG. 3.
Figure 12:
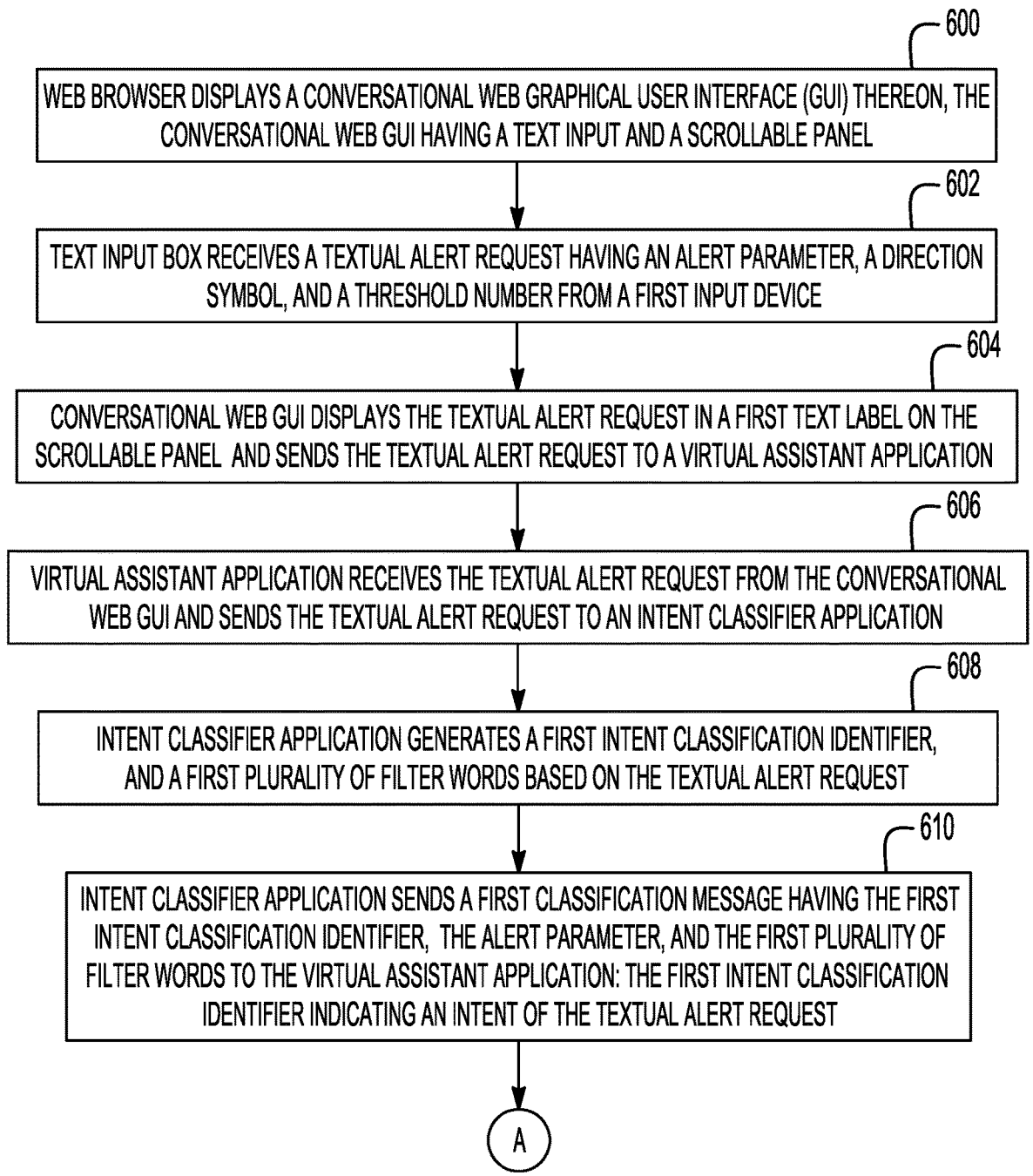
Figure 13:
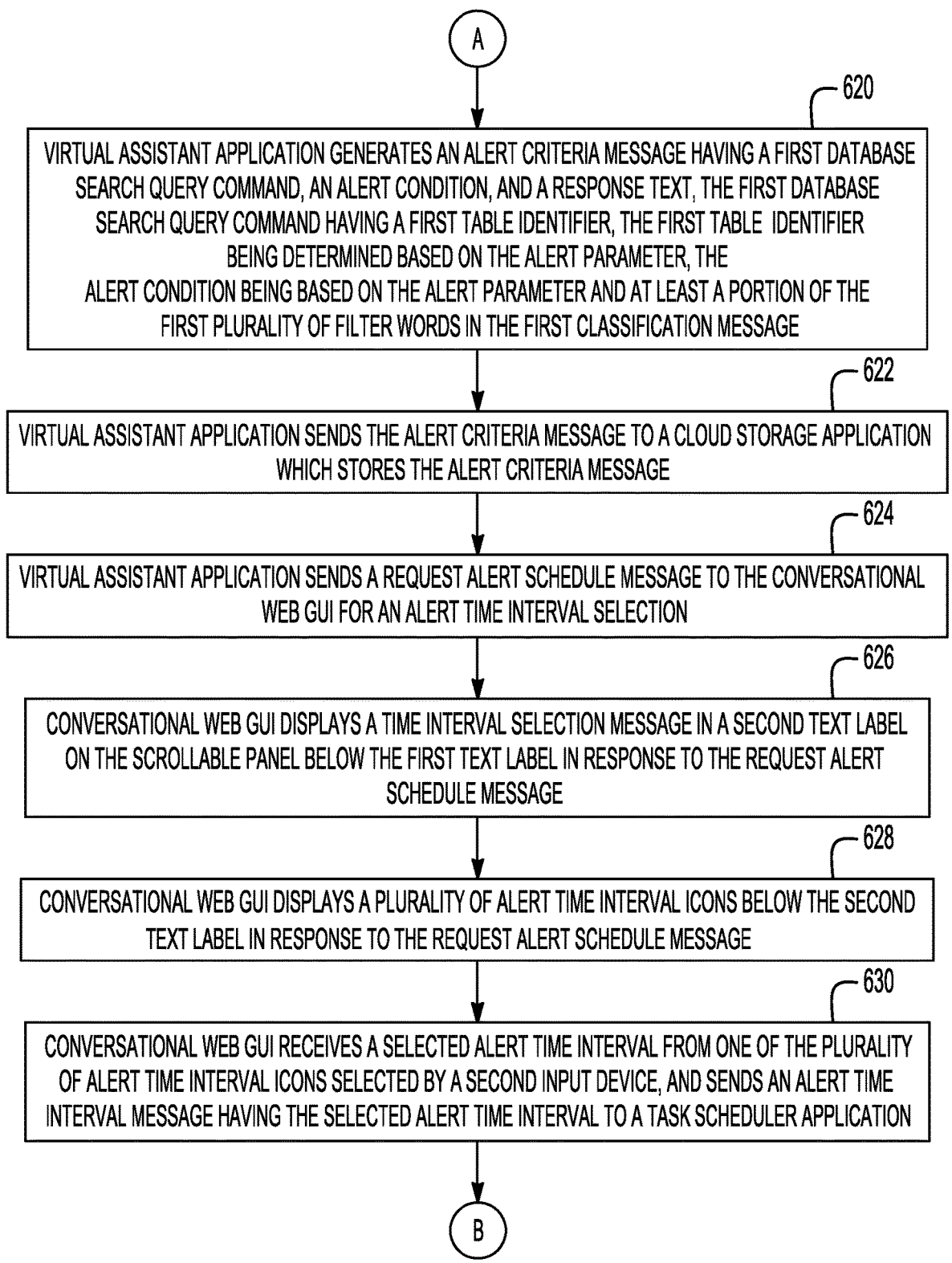
Figure 14:
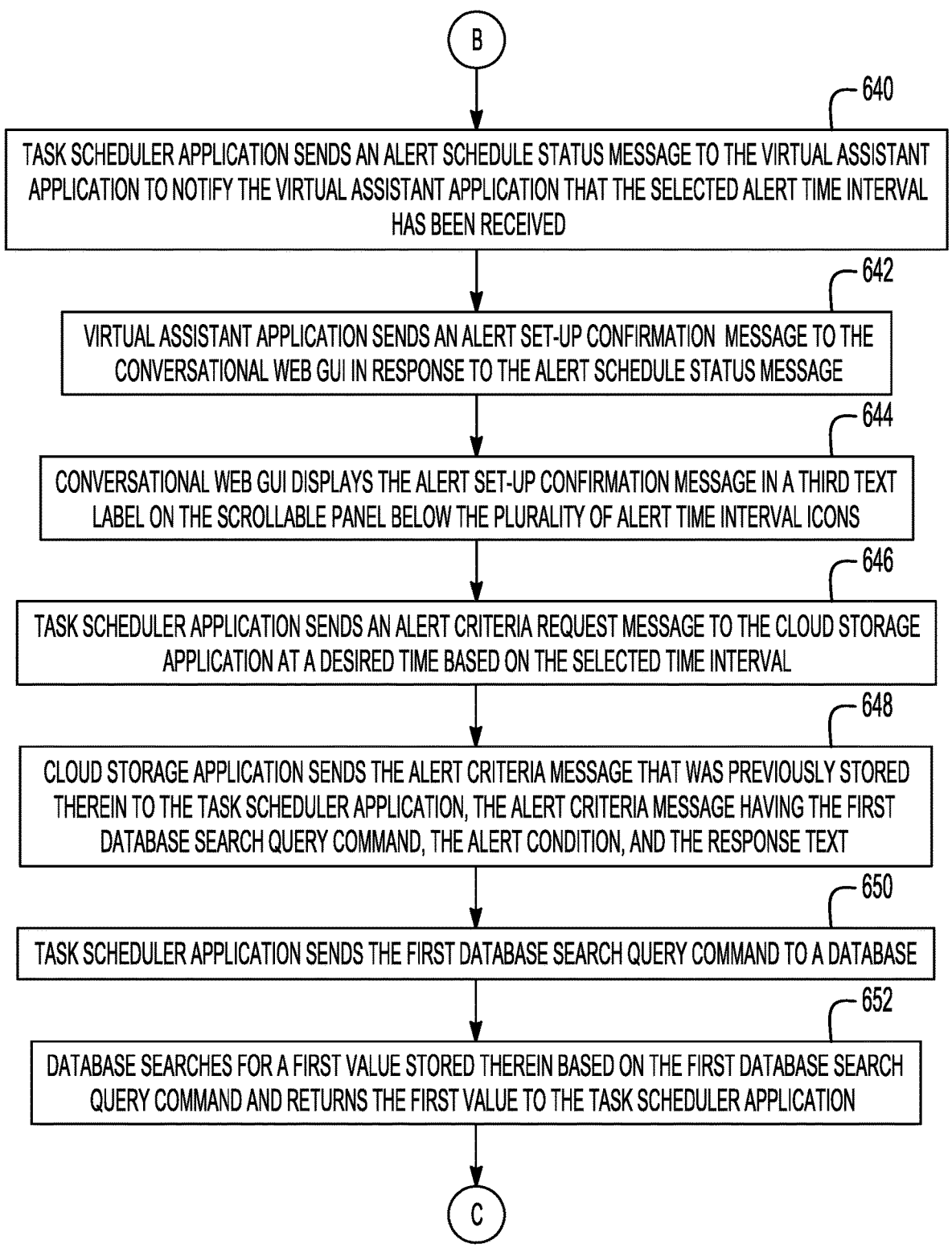
Figure 15:
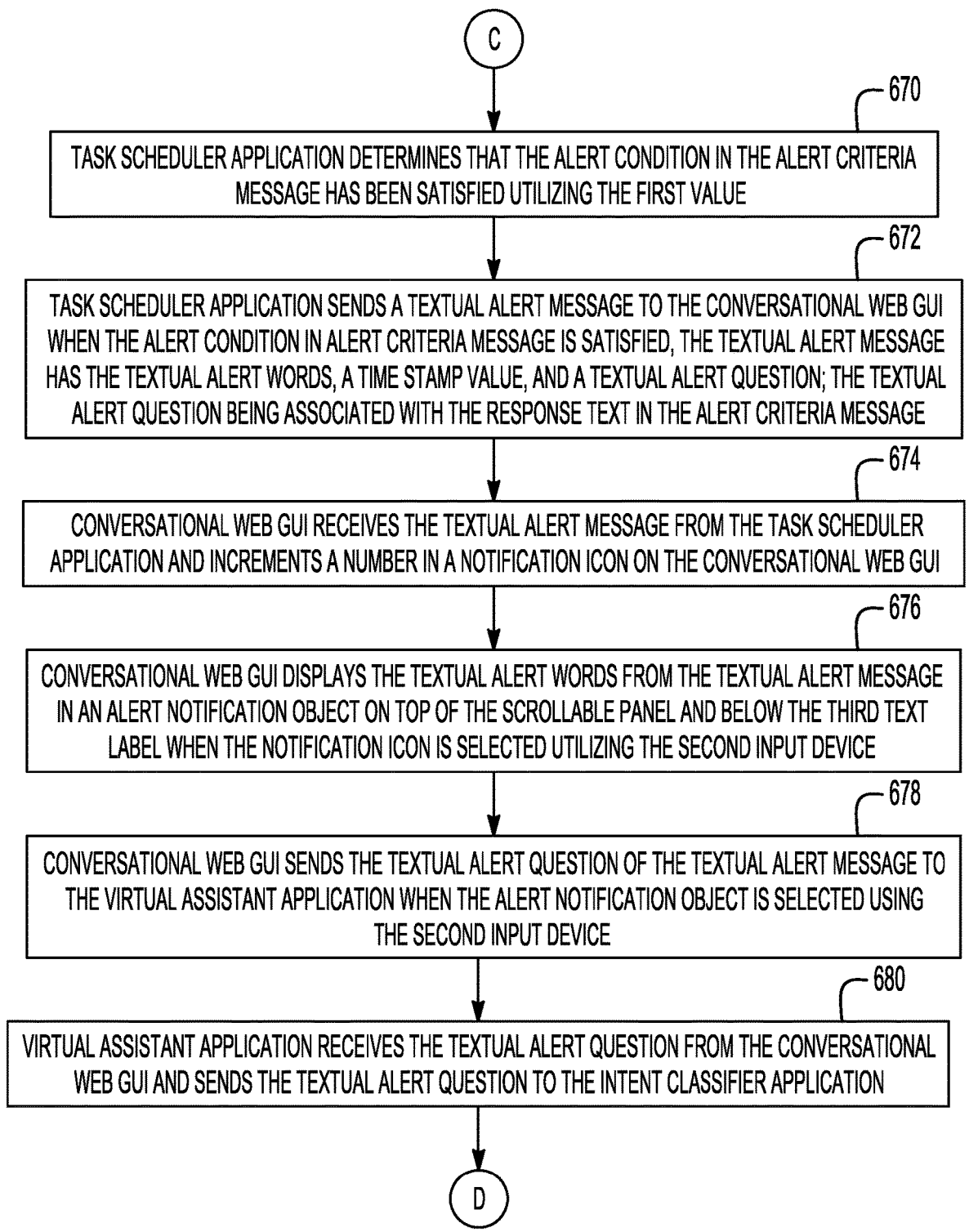
Figure 16:
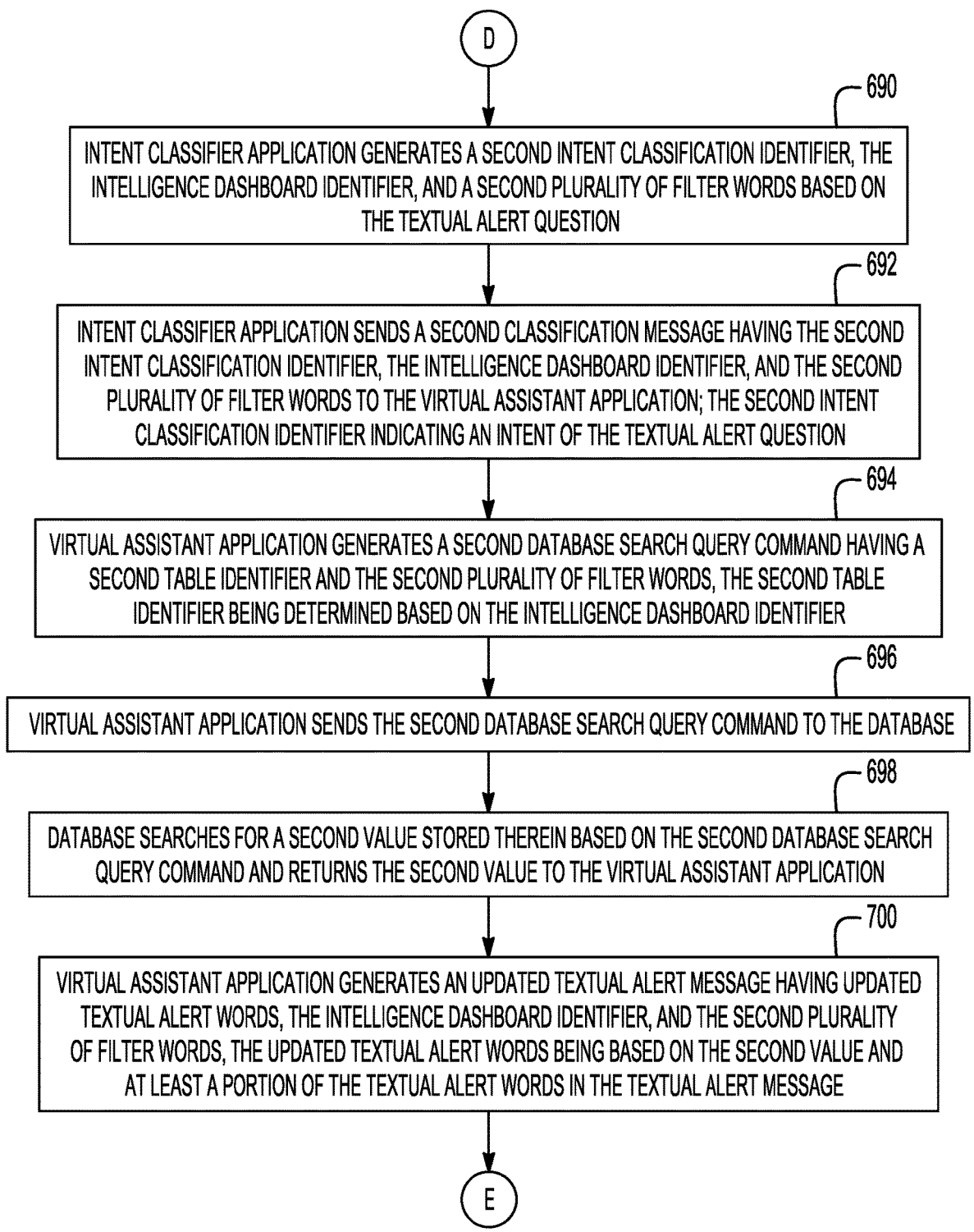
Figure 17:
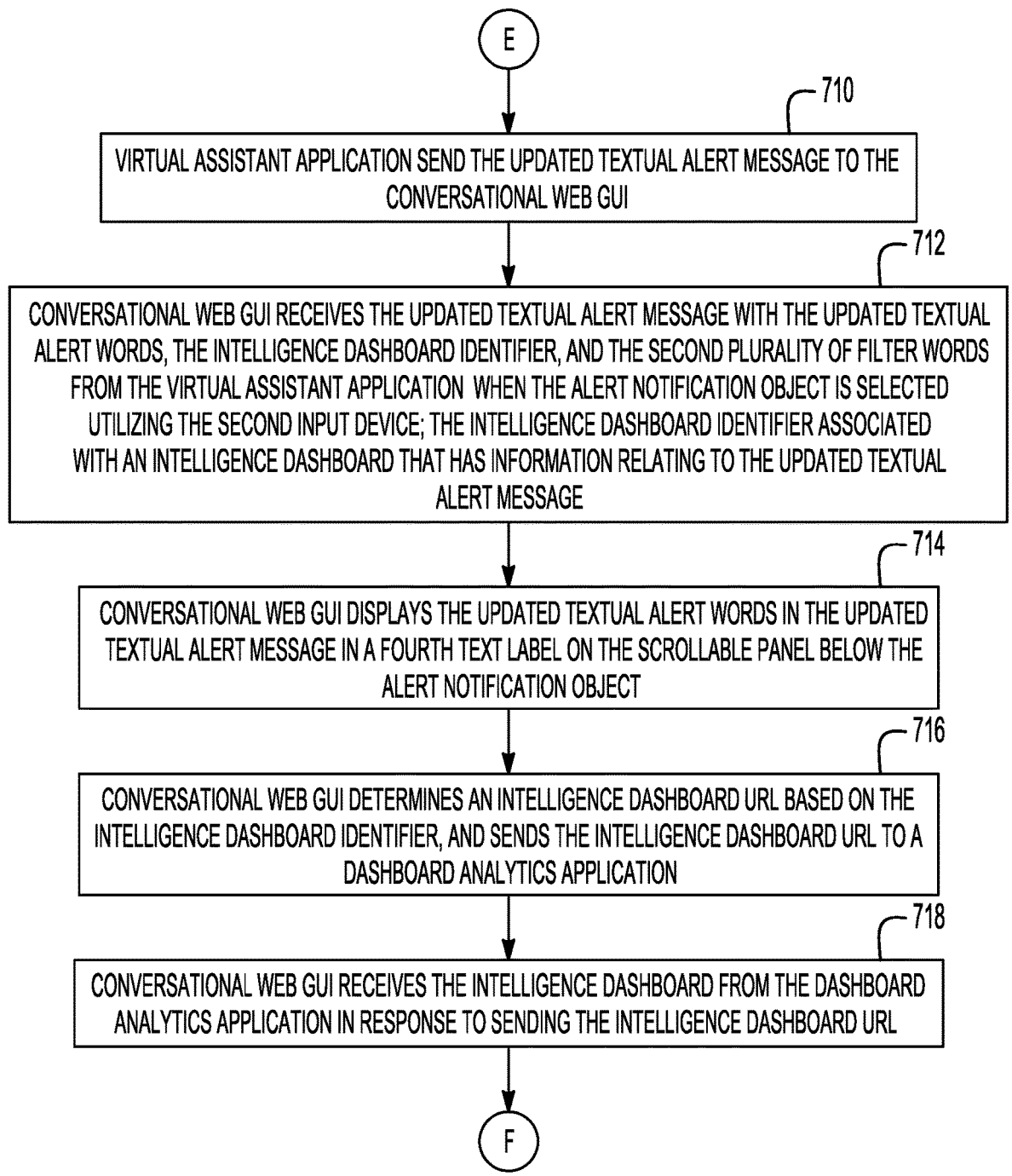
Figure 29:
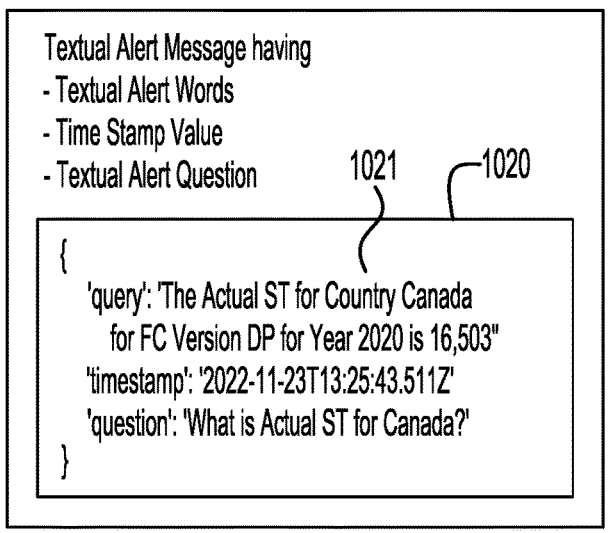
FIG. 29 is a schematic of an exemplary textual alert message having textual alert words, a timestamp value, and a textual alert question utilized in the cloud-based system of FIG. 2.

Referring to FIGS. 1-11, the cloud-based system 50 is provided to obtain a textual alert message 1020 (shown in FIG. 29) in response to a textual alert request 800 (shown in FIGS. 3 and 19), and an updated textual alert message 1120 (shown in FIG. 34) and an intelligence dashboard 400 (shown in FIG. 10). And sequential vertical positions of the textual alert request 800, textual alert words 1021 (shown in FIG. 8) of the textual alert message 1020, updated textual alert words 1121 (shown in FIG. 9) of the updated textual alert message 1120, and the intelligence dashboard 400 on the scrollable panel 160 (shown in FIG. 3) correspond to or simulate a conversation between a user and the system 50. Referring to the data and numerical values disclosed herein, it is assumed that the current year is 2020 and that the year has not yet ended.

Figure 2:
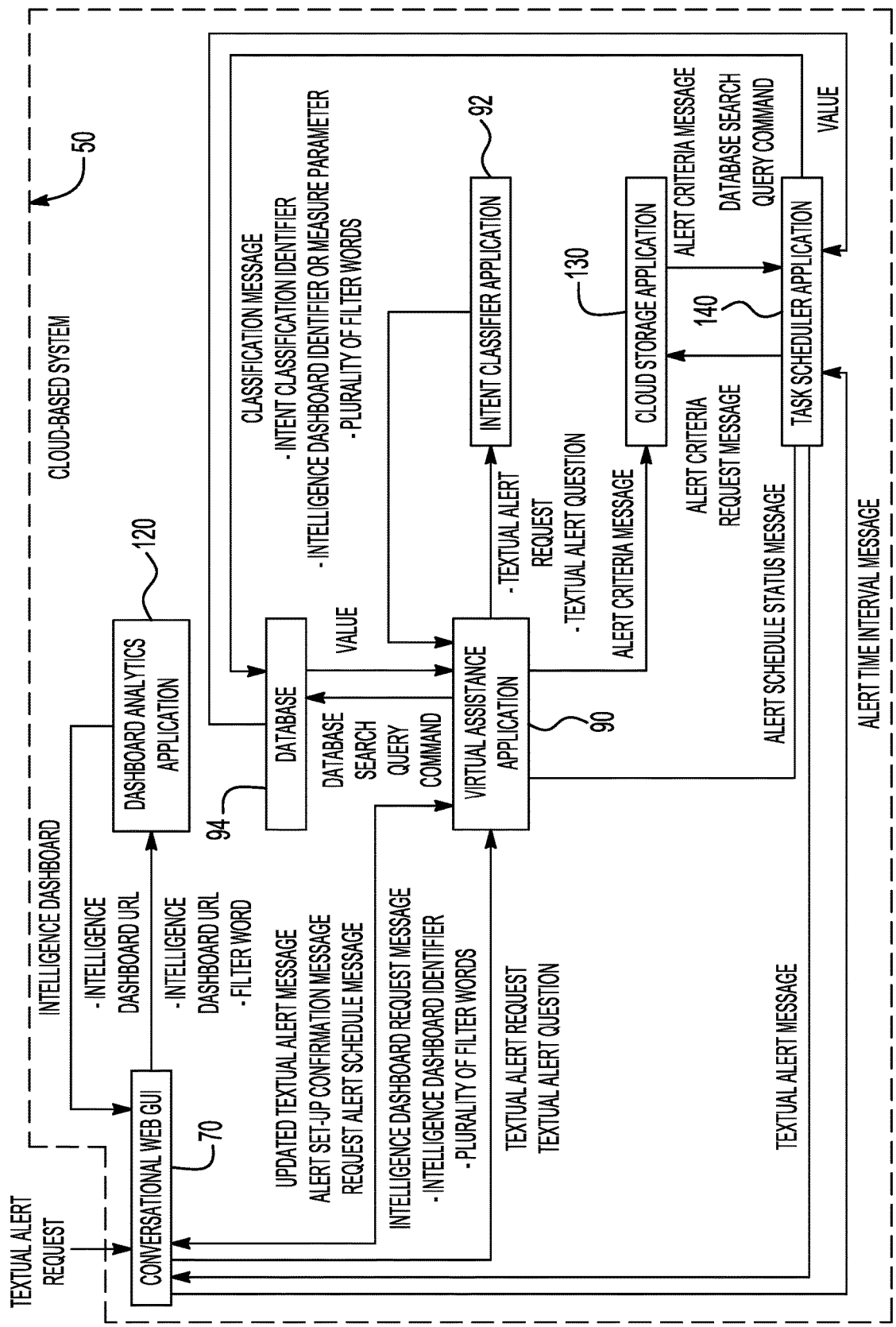
FIG. 2 is a block diagram of the cloud-based system of FIG. 1 which generates a textual alert message in response to a textual alert request and an intelligence dashboard in accordance with an exemplary embodiment.

Referring to FIG. 2, the cloud-based system 50 includes the conversational web GUI 70, a virtual assistant application 90, an intent classifier application 92, a database 94, a dashboard analytics application 120, a cloud storage application 130, and a task scheduler application 140.

Referring to FIGS. 2-11, the conversational web GUI 50 includes a text input box 150, a scrollable panel 160, a scrollbar 170, a menu 180, a first text label 181, a second text label 202 (shown in FIG. 4), a plurality of alert time interval icons 210 including alert time interval icons 211, 212, 214, 216, a third text label 223 (shown in FIG. 5), a notification icon 230 (shown in FIG. 7), an alert notification object 240 (shown in FIG. 8), a fourth text label 254 (shown in FIG. 9), and an inline frame 300.

Figure 3:
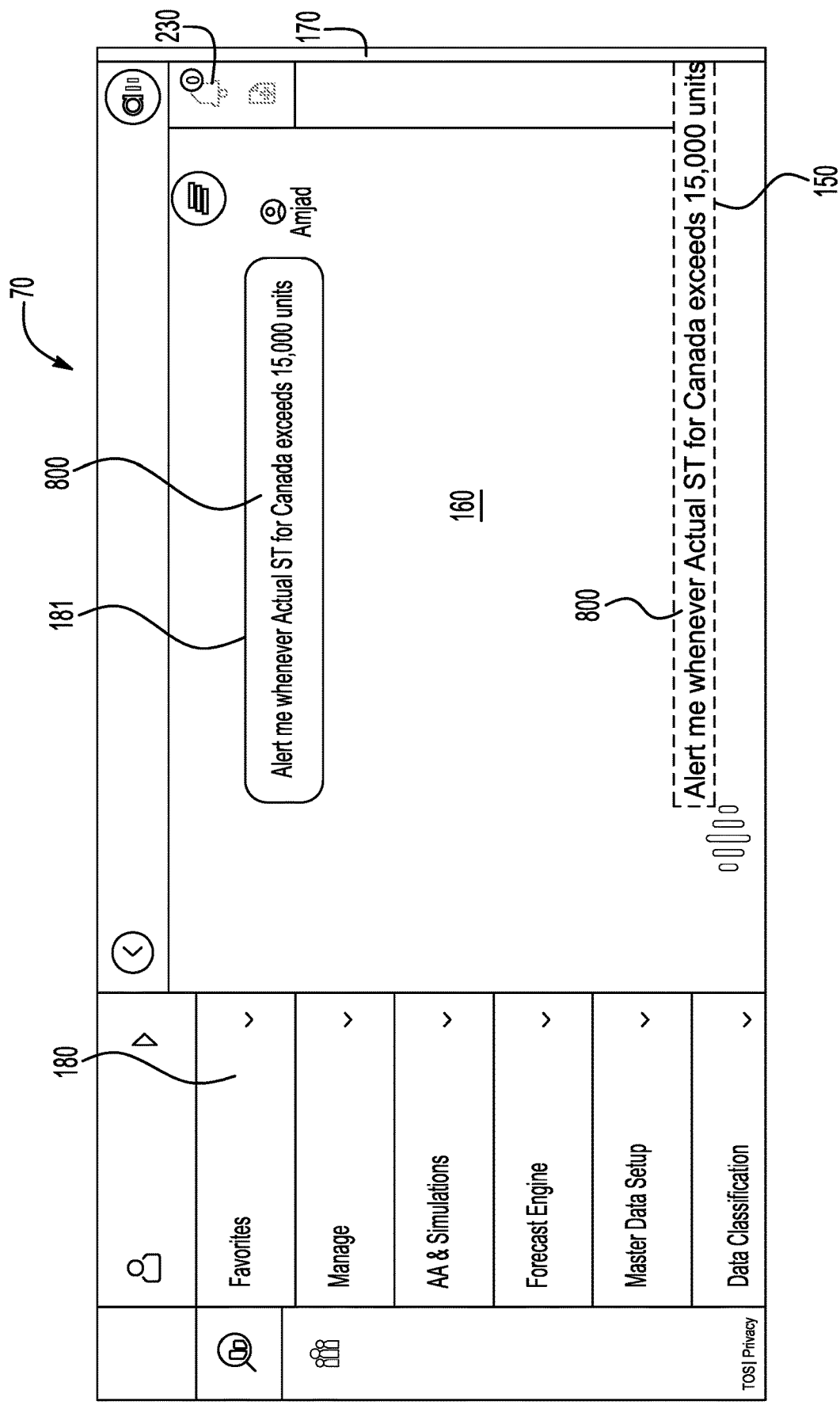
FIG. 3 is a schematic of a conversational web GUI utilized in the cloud-based system of FIG. 2.

Referring to FIGS. 1 and 3, the text input box 150 is disposed below the scrollable panel 160 on the conversational web GUI 70. The text input box 150 is provided to receive a textual alert request 800 utilizing the first input device 40.

The menu 180 is disposed leftward of the scrollable panel 160 in the conversational web GUI 70. The menu 180 includes selection icons for selecting other applications within the conversational web GUI 70.

Figure 4:
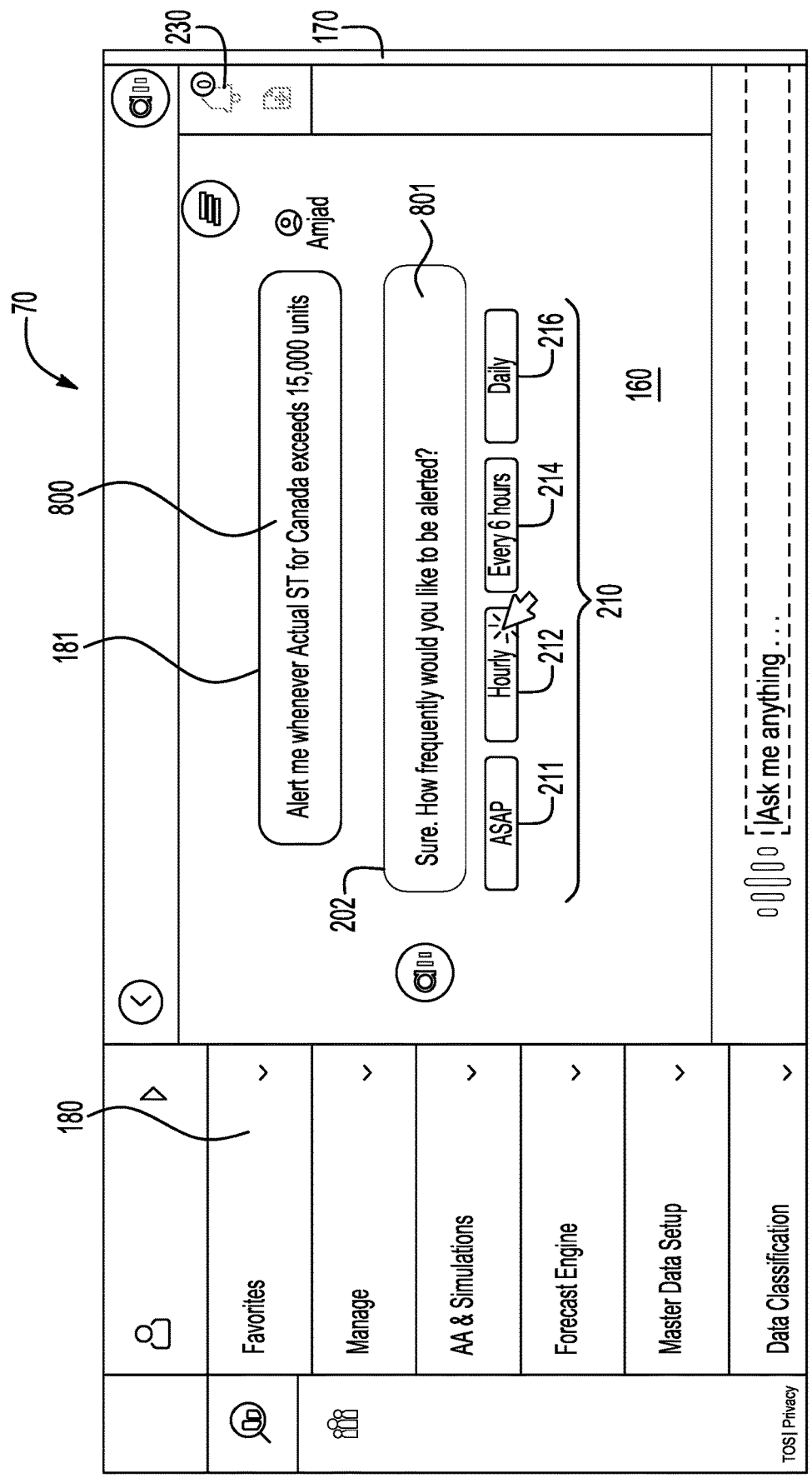
FIG. 4 is another schematic of the conversational web GUI of FIG. 3.

Referring to FIGS. 3 and 4, the scrollable panel 160 is disposed above the text input box 150. The scrollable panel 160 has the first text label 181, a second text label 202 (shown in FIG. 4), a plurality of alert time interval icons 210 including alert time interval icons 211, 212, 204, 216, a third text label 223 (shown in FIG. 5), an alert notification object 240 (shown in FIG. 8), a fourth text label 254, and an inline frame 300 sequentially displayed thereon.

Referring to FIG. 3, the first text label 181 is utilized to display the textual alert request 800 therein. In an exemplary embodiment, the textual alert request 800 recites "Alert me whenever Actual ST for Canada exceeds 15,000 units" after the user inputted the text.

Referring to FIG. 4, the second text label 202 is provided to display a time interval selection message therein. In an exemplary embodiment, the time interval selection message recites "Sure. How frequently would you like to be alerted?"

Figure 5:
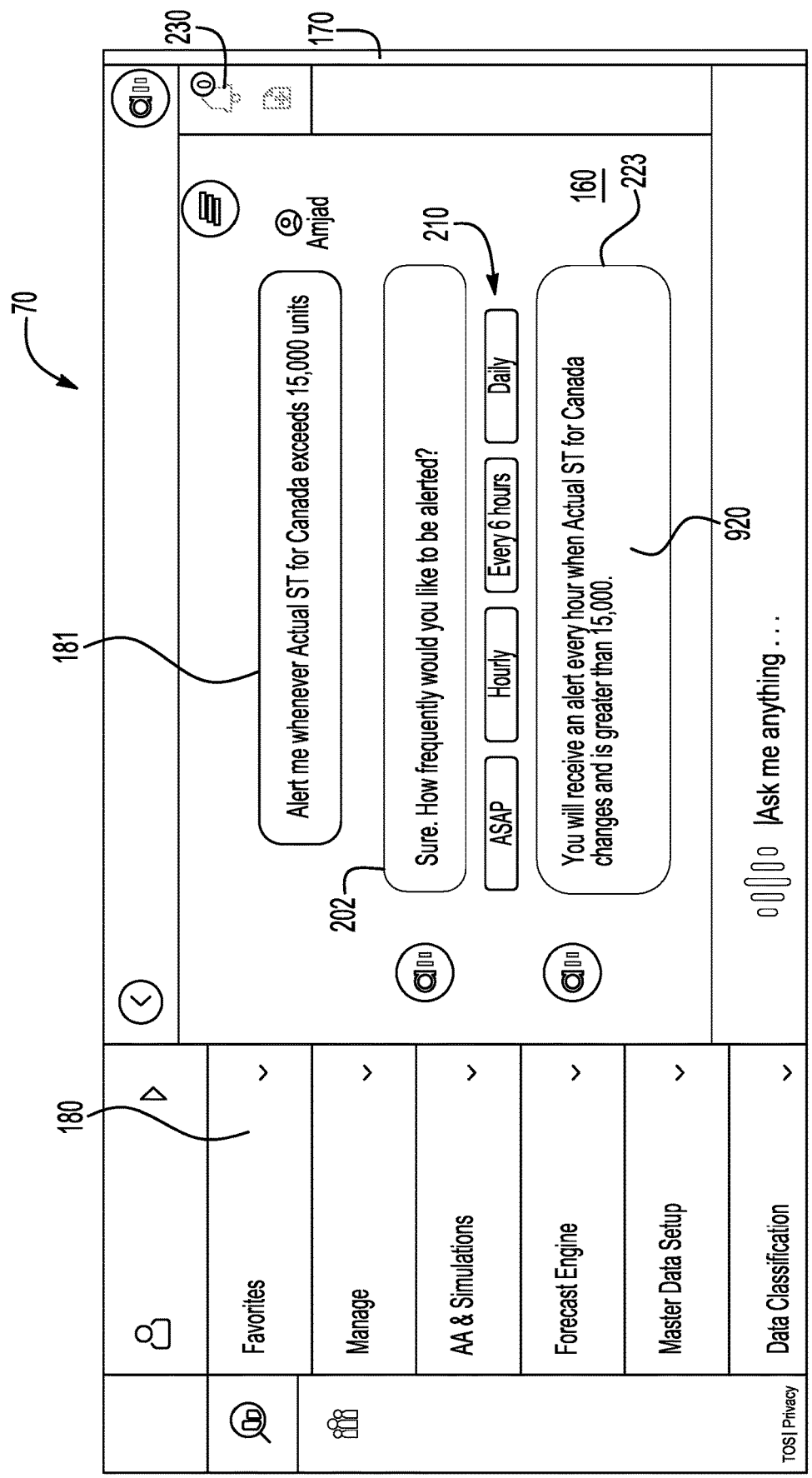
FIG. 5 is another schematic of the conversational web GUI of FIG. 3.
Figure 6:
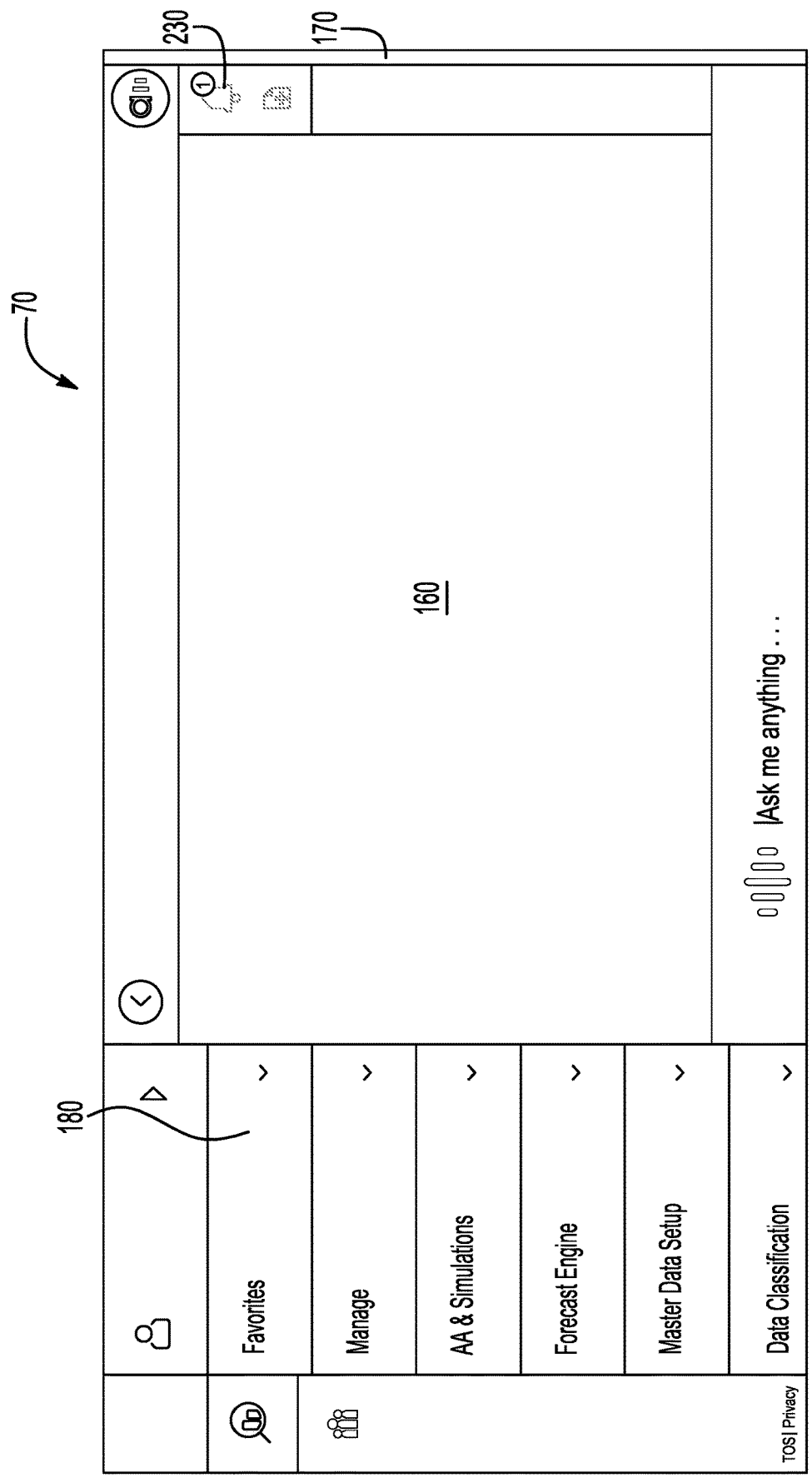
FIG. 6 is another schematic of the conversational web GUI of FIG. 3.

Referring to FIG. 5, the plurality of alert time interval icons 210 including alert time interval icons 211, 212, 204, 216 are provided to allow a user to select a time interval for receiving a textual alert message if conditions in the textual alert request are satisfied.

For example, the alert time interval icon 211 allows a user to select a time interval, designated "ASAP" (as soon as possible), for receiving a textual alert message, if the icon 211 is selected by a user and the conditions in the textual alert request are satisfied.

The alert time interval icon 212 allows a user to select a time interval, designated "Hourly" (i.e., every 60 minutes) for receiving a textual alert message, if the icon 212 is selected by a user and the conditions in the textual alert request are satisfied during that time interval.

The alert time interval icon 214 allows a user to select a time interval, designated "Every 6 hours" (i.e., every 6 hours) for receiving a textual alert message, if the icon 214 is selected by a user and the conditions in the textual alert request are satisfied during that time interval.

The alert time interval icon 216 allows a user to select a time interval, designated "Daily" (i.e., every 24 hours) for receiving a textual alert message, if the icon 216 is selected by a user and the conditions in the textual alert request are satisfied during that time interval.

Figure 25:
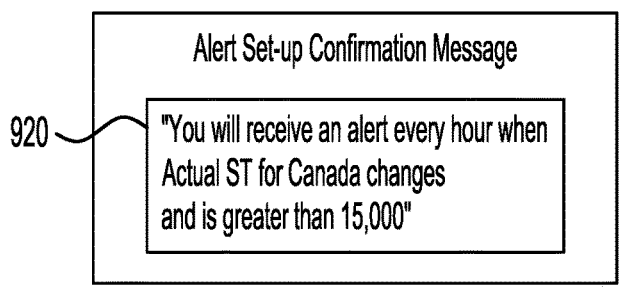
FIG. 25 is a schematic an exemplary alert set-up confirmation message utilized in the cloud-based system of FIG. 2.

Referring to FIGS. 4 and 25, the third text label 223 is disposed below the plurality of alert time interval icons 210 on the scrollable panel 160. The third text label 223 is provided to display an alert set-up confirmation message 920 therein. In an exemplary embodiment, the alert set-up confirmation message 920 recites "You will receive an alert every hour when Actual ST for Canada changes and is greater than 15,000" when the alert time interval icon 212 is selected.

Figure 7:
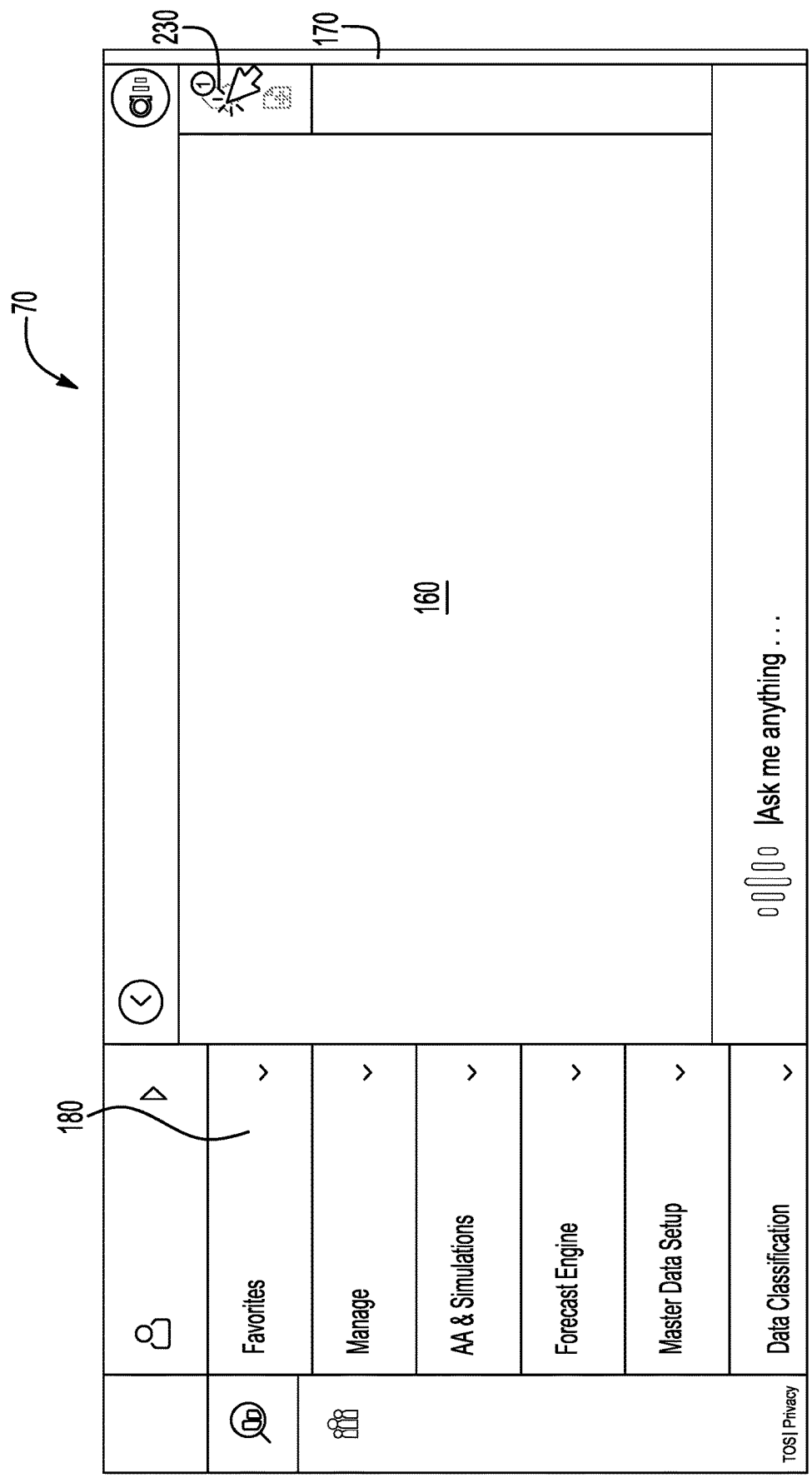
FIG. 7 is another schematic of the conversational web GUI of FIG. 3.

Referring to FIGS. 7 and 8, the notification icon 230 is disposed on the conversational web GUI 70 rightward of the scrollable panel 160. The notification icon 230 has a "0" value displayed thereon when no textual alert message has been generated by the cloud-based system 50. Also, the notification icon 230 has a "1" value displayed thereon when a textual alert message has been generated by the cloud-based system 50, which the user can subsequently access to view on the scrollable panel 160 by clicking on the notification icon 230.

Figure 30:
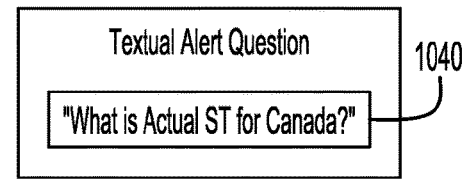
FIG. 30 is a schematic of an exemplary textual alert question utilized in the cloud-based system of FIG. 2.

Referring to FIGS. 5, 8 and 30, the alert notification object 240 is disposed below the third text label 223 on top of the scrollable panel 160. The alert notification object 240 is provided to display textual alert words 1021 in a textual alert message 1020 therein. In an exemplary embodiment, the textual alert words 1021 in the textual alert message 1020 are "The Actual ST for Country Canada for FC Version DP for year 2020 is 16,503."

Figure 34:
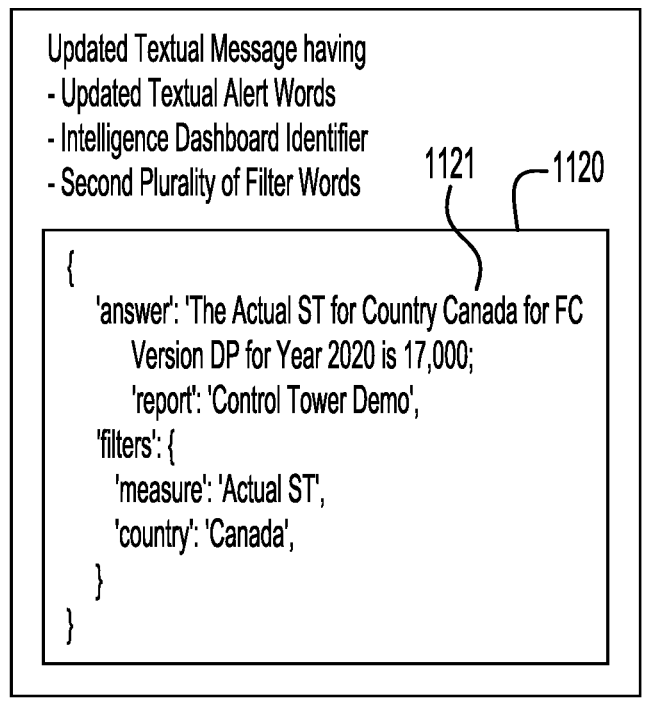
FIG. 34 is a schematic of an updated textual alert message having updated textual alert words, an intelligence dashboard identifier, and a second plurality filter words utilized in the cloud-based system of FIG. 2.

Referring to FIGS. 8, 9 and 34, the fourth text label 254 is disposed below the alert notification object 240 on the scrollable panel 160. The fourth text label 254 is provided to display an updated textual alert words 1121 in an updated textual alert message 1120 therein. In an exemplary embodiment, the updated textual alert words 1121 in an updated textual alert message 1120 are "The Actual ST for Country Canada for FC Version DP for year 2020 is 17,000", which corresponds to the latest information associated with the textual alert question 1040 (shown in FIG. 30).

Referring to FIGS. 9-12, the inline frame 300 is displayed below the fourth text label 254 on the scrollable panel 160. The inline frame 300 is provided to display the intelligence dashboard 400 therein. The exemplary intelligence dashboard 400 includes data icons 410, 412, 414, 416, 418, 420, 422, filter selection controls 450, 452, 454, 456, 458, 460, 462, 464, 466, a map image 490, a graphic image 500, and a table 510—which include information related to the textual alert question 1040 (shown in FIG. 30). The filter selection controls 450 allow a user to obtained filtered data associated with the textual alert question 1040 that is displayed in the data icons 410, 412, 414, 416, 418, 420, 422, the map image 490, the graphic image 500, and the table 510.

The contents within the scrollable panel 160 is moved upwardly or downwardly in the conversational web GUI 50 utilizing the scroll bar 170, such that a user can see a history of the textual alert request 800 (shown in FIG. 3), the textual alert words 1021 (shown in FIGS. 8 and 30) in the textual alert message 1020, the updated textual alert words 1121 (shown in FIGS. 9 and 35) in the updated textual alert message 1120, and the intelligence dashboard on the scrollable panel 160.

Figure 35:
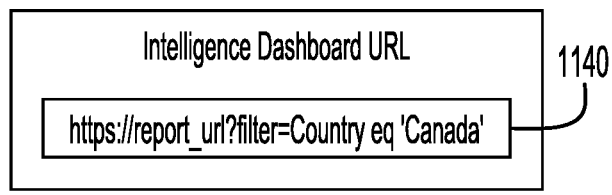
FIG. 35 is a schematic of an intelligence dashboard URL utilized in the cloud-based system of FIG. 2.

Referring to FIGS. 1, 2, 12-18, 19, 30, and 35 a flowchart of a method for obtaining and displaying a textual alert request 800, a textual alert message 1020, an updated textual alert message 1120, and an intelligence dashboard 400 in a scrollable panel 160 to simulate a conversation between a user and the system 50 in accordance with another exemplary embodiment will be explained. The textual alert request 800 is shown in FIG. 19, the textual alert message 1020 is shown in FIG. 30, the updated textual alert message 1120 is shown in FIG. 35, and the intelligence dashboard 400 is shown in FIG. 10.

At step 600, the web browser 60 displays a conversational web graphical user interface (GUI) 70 thereon. The conversational web GUI 70 has a text input box 150 (shown in FIG. 3) and a scrollable panel 160.

At step 602, the text input box 150 receives a textual alert request 800 having an alert parameter, a direction word or symbol, and a threshold number from the first input device 40. In an exemplary embodiment, the textual alert request 800 is "Alert me whenever Actual ST for Canada exceeds 15,000 units)", the alert parameter is "Actual ST", the direction word or symbol is "exceeds" or ">", and the threshold number is "15,000."

At step 604, the conversational web GUI 70 displays the textual alert request 800 in a first text label 181 (shown in FIG. 3) on the scrollable panel 160, and sends the textual alert request 800 to a virtual assistant application 90 (shown in FIG. 2).

At step 606, the virtual assistant application 90 receives the textual alert request 800 from the conversational web GUI 70 and sends the textual alert request 800 to an intent classifier application 92.

At step 608, the intent classifier application 92 generates a first intent classification identifier and a first plurality of filter words based on the textual alert request 800. In an exemplary embodiment, the first intent classification identifier is "alert_set" and the first plurality of filter words are "country, Canada, >, 15000)"

At step 610, the intent classifier application 92 sends a first classification message 820 (shown in FIG. 20) having the first intent classification identifier, the intelligence dashboard identifier, and the first plurality of filter words to the virtual assistant application 90. In an exemplary embodiment, the first intent classification identifier is "alert_set", the alert parameter is "Actual ST", and the first plurality of filter words are "country, Canada, >, 15000". The first intent classification identifier indicates an intent (e.g., alert request) of the textual alert request 800.

Figure 21:
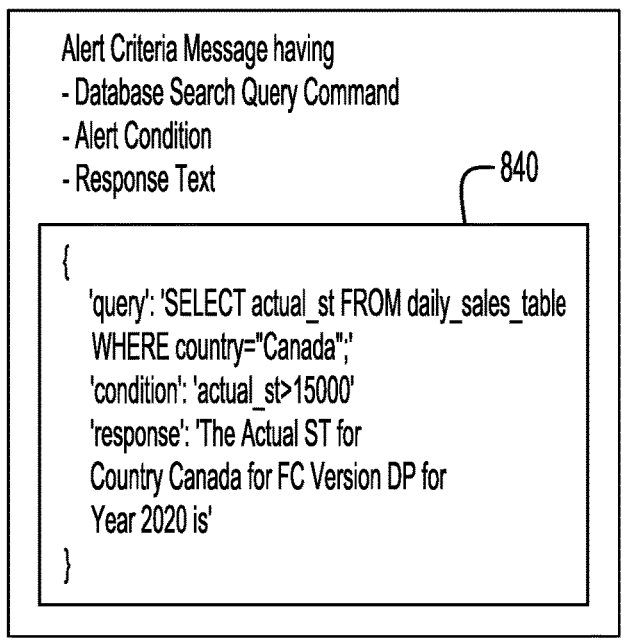
FIG. 21 is a schematic of an exemplary alert criteria message having a database search query command, an alert condition, and response text utilized in the cloud-based system of FIG. 2.

At step 620, the virtual assistant application 90 generates an alert criteria message 840 (shown in FIG. 21) having a first database search query command, an alert condition, and response text. In exemplary embodiment, the first database search query command is "SELECT actual_st FROM daily_sales_table", the alert condition is "actual_st>15000", and the response text is "The Actual ST for Country Canada for FC Version DP For Year 2020 is." The first database search query command has a first table identifier. The first table identifier (e.g., daily_sales_table) identifies a specific table in the database 94, and is determined based on the alert parameter (e.g., Actual ST) in the first classification message 820. In an exemplary embodiment, the virtual assistant application 90 utilizes an internal table having a record with the fields "Actual ST" and "daily_sales_table" to associate these two terms with one another so that the application 90 can determine the first table identifier "daily_sales_table" based on the alert parameter "Actual ST." The alert condition (e.g., actual_st>15000) is based on the alert parameter (e.g., Actual ST) and at least a portion of the first plurality of filter words (e.g., >, 15000) in the first classification message 820.

At step 622, the virtual assistant application 90 sends the alert criteria message 840 (shown in FIG. 21) to a cloud storage application 130 which stores the alert criteria message 840 therein.

At step 624, the virtual assistant application 90 sends a request alert schedule message 860 (e.g., "request_alert_schedule" shown in FIG. 22) to the conversational web GUI 70 for an alert time interval selection.

Figure 22:
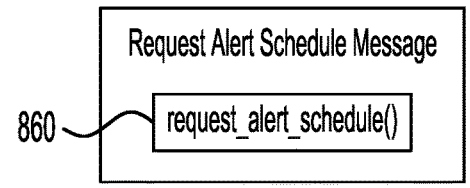
FIG. 22 is a schematic of an exemplary request alert schedule message utilized in the cloud-based system of FIG. 2.

At step 626, the conversational web GUI 70 displays a time interval selection message 801 in a second text label 202 on the scrollable panel 160 below the first text label 181 in response to the request alert schedule message 860 (shown in FIG. 22). In an exemplary embodiment, the time interval selection message 801 is "Sure. How frequently would you like to be alerted?" shown in FIG. 4.

At step 628, the conversational web GUI 70 displays a plurality of alert time interval icons 210 (shown in FIG. 4) below the second text label 202 in response to the request alert schedule message 860 (shown in FIG. 22).

Figure 23:
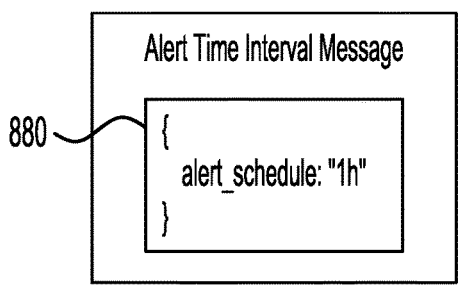
FIG. 23 is a schematic an exemplary alert time interval message utilized in the cloud-based system of FIG. 2.

At step 630, the conversational web GUI 70 receives a selected alert time interval from one of the plurality of alert time interval icons 210 selected by the second input device 41 (e.g., a mouse), and sends an alert time interval message 880 (shown in FIG. 23) having the selected alert time interval to a task scheduler application 140. In an exemplary embodiment, the alert time interval message 880 is "alert_schedule: "1 h"" shown in FIG. 23 having the selected alert time interval (e.g., 1 hour)

Figure 24:
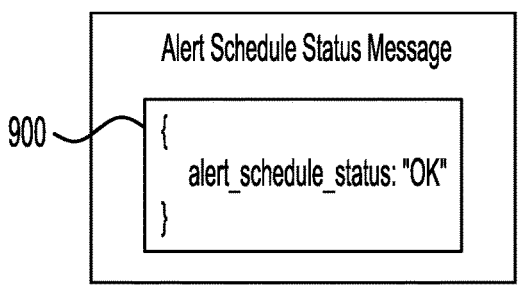
FIG. 24 is a schematic an exemplary alert schedule status message utilized in the cloud-based system of FIG. 2.

At step 640, the task scheduler application 140 sends an alert schedule status message 900 (shown in FIG. 24) to the virtual assistant application 90 to notify the virtual assistant application 90 that the selected alert time interval has been received. In an exemplary embodiment, the alert schedule status message 900 is "alert_schedule_status: "OK" shown in FIG. 24.

At step 642, the virtual assistant application 90 sends an alert set-up confirmation message 920 (shown in FIG. 25) to the conversational web GUI 70 in response to the alert schedule status message 900. In an exemplary embodiment, the alert set-up confirmation message 920 is "You will receive an alert every hour when Actual ST for Canada changes and is greater than 15,000" shown in FIG. 25.

At step 644, the conversational web GUI 70 displays the alert set-up confirmation message 920 in a third text label 223 (shown in FIG. 5) on the scrollable panel 160 below the plurality of alert time interval icons 210.

Figure 26:
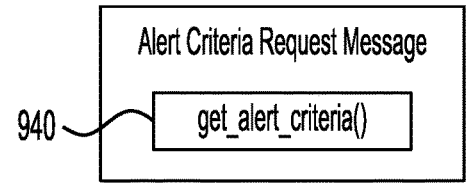
FIG. 26 is a schematic an exemplary alert criteria request message utilized in the cloud-based system of FIG. 2.

At step 646, the task scheduler application 140 sends an alert criteria request message 940 (e.g., get_alert_criteria( ) shown in FIG. 26) to the cloud storage application 130 at a desired time based on the selected alert time interval.

At step 648, the cloud storage application 130 sends the alert criteria message 840 (shown in FIG. 21) that was previously stored therein to the task scheduler application 140. The alert criteria message 840 has the first database search query command 980, the alert condition, and the response text. In an exemplary embodiment, the first database search query command is "SELECT actual_st FROM daily_sales_table", the alert condition is "actual_st>15000", and the response text is "The Actual ST for Country Canada for FC Version DP for Year 2020 is."

Figure 27:
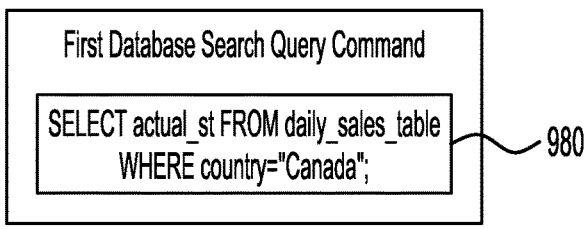
FIG. 27 is a schematic of an exemplary first database search query command utilized in the cloud-based system of FIG. 2.
Figure 28:
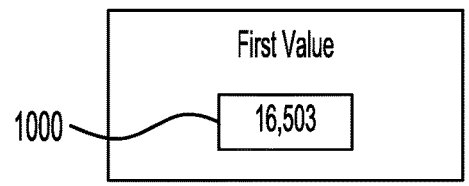
FIG. 28 is a schematic of an exemplary first value utilized in the cloud-based system of FIG. 2.

At step 650, the task scheduler application 140 sends the first database search query command 980 (shown in FIG. 27) to a database 94. In an exemplary embodiment, the first database search query command is "SELECT actual_st FROM daily_sales_table WHERE country='' Canada."

At step 652, the database 94 searches for a first value 1000 (e.g., 16,503) stored therein based on the first database search query command 980 and returns the first value 1000 to the task scheduler application 140.

At step 670, the task scheduler application 140 determines that the alert condition in the alert criteria message 840 has been satisfied utilizing the first value 1000 (e.g., 16,503). In particular, the task scheduler application 140 determines the alert condition (e.g., actual_st?15000) has been satisfied when 16,503 (e.g., actual_st)>15000.

At step 672, the task scheduler application 140 sends a textual alert message 1020 (shown in FIG. 29) to the conversational web GUI 70 when the alert condition in alert criteria message 840 is satisfied. The textual alert message 1020 has the textual alert words, a time stamp value, and a textual alert question. In an exemplary embodiment, the textual alert words 1021 are "The Actual ST for Country Canada for FC Version DP for Year 2020 is 16,503", the time stamp value is "2022-11-23T13:25:43.511Z", and the textual alert question is "What is the Actual ST for Canada?" The textual alert question is associated with the response text (e.g., The Actual ST for Canada is) in the alert criteria message 840 (shown in FIG. 21).

At step 674, the conversational web GUI 70 receives the textual alert message 1020 (shown in FIG. 29) from the task scheduler application 140 and increments a number in a notification icon 230 (shown in FIG. 6) on the conversational web GUI 70.

At step 676, the conversational web GUI 70 displays the textual alert words 1021 (e.g., "The Actual ST for Country Canada for FC Version DP for Year 2020" is 16,503" shown in FIG. 8) from the textual alert message 1021 (shown in FIG. 29) in an alert notification object 240 on top of the scrollable panel 160 and below the third text label 223 when the notification icon 230 is selected utilizing the second input device 41.

At step 678, the conversational web GUI 70 sends the textual alert question 1040 (shown in FIG. 30) of the textual alert message 1020 (shown in FIG. 29) to the virtual assistant application 90 when the alert notification object 240 (shown in FIG. 8) is selected using the second input device 41.

At step 680, the virtual assistant application 90 receives the textual alert question 1040 from the conversational web GUI 70 and sends the textual alert question 1040 to the intent classifier application 92.

At step 690, the intent classifier application 92 generates a second intent classification identifier (e.g., measure_filter), the intelligence dashboard identifier (e.g., Control Tower Demo), and a second plurality of filter words (e.g., Actual ST, Canada) based on the textual alert question 1040 (shown in FIG. 30).

Figure 31:
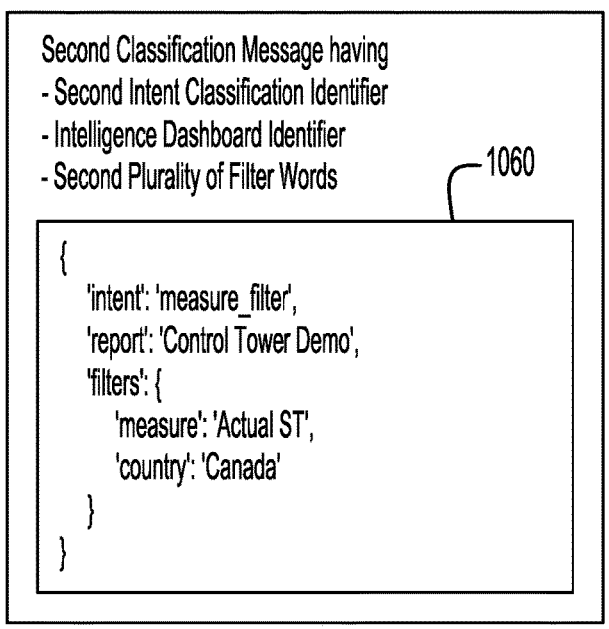
FIG. 31 is a schematic of a second classification message having a second intent classification identifier, an intelligence dashboard identifier, and a second plurality of filter words utilized in the cloud-based system of FIG. 2.

At step 692, the intent classifier application 92 sends a second classification message 1060 (shown in FIG. 31) having the second intent classification identifier (e.g., measure_filter), the intelligence dashboard identifier (e.g., Control Tower Demo), and the second plurality of filter words (e.g., Actual ST, Canada) to the virtual assistant application 90. The second intent classification identifier indicates an intent (e.g., obtain a measured Actual ST value) of the textual alert question 1040.

Figure 32:
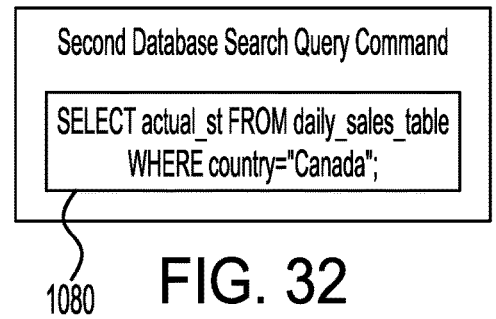
FIG. 32 is a schematic of an exemplary second database search query command utilized in the cloud-based system of FIG. 2.
Figure 33:
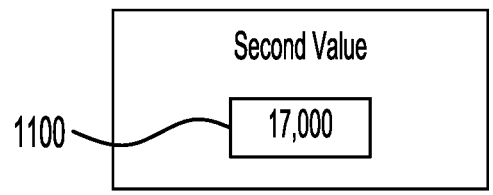
FIG. 33 is a schematic of an exemplary second value utilized in the cloud-based system of FIG. 2.

At step 694, the virtual assistant application 90 generates a second database search query command 1080 (shown in FIG. 32) having a second table identifier and the second plurality of filter words. In an exemplary embodiment, the search query command 1080 is "SELECT actual_st FROM daily_sales_table WHERE country='Canada'" shown in FIG. 32, the second table identifier is "daily_sales_table", and the second plurality of filter words are "Actual ST, Canada." The second table identifier (e.g., daily_sales_table) identifies a specific table in the database 94, and is determined based on the intelligence dashboard identifier (e.g., Control Tower Demo) in the second classification message 1060. In an exemplary embodiment, the virtual assistant application 90 utilizes an internal table having a record with the fields "Control Tower Demo" and "daily_sales_table" to associate these two terms with one another so that the application 90 can determine the second table identifier "daily_sales_table" based on the intelligence dashboard identifier "Control Tower Demo."

At step 696, the virtual assistant application 90 sends the second database search query command 1080 (shown in FIG. 32) to the database 94.

At step 698, the database 94 searches for a second value 1100 (e.g., 17,000) stored therein based on the second database search query command 1080 and returns the second value 1100 to the virtual assistant application 90.

At step 700, the virtual assistant application 90 generates an updated textual alert message 1120 (shown in FIG. 34) having updated textual alert words, the intelligence dashboard identifier, and the second plurality of filter words. In an exemplary embodiment, the updated textual alert words are "The Actual ST for Country Canada for FC Version DP for Year 2020 is 16,503", the intelligence dashboard identifier is "Control Tower Demo", and the second plurality of filter words are "Actual ST, Canada." The updated textual alert words are based on the second value (e.g., 16,503) and at least a portion of the textual alert words in the textual alert message 1020 (shown in FIG. 29).

At step 710, the virtual assistant application 90 sends the updated textual alert message 1120 (shown in FIG. 34) to the conversational web GUI 70.

At step 712, the conversational web GUI 70 receives the updated textual alert message 1120 (shown in FIG. 34) with updated textual alert words, the intelligence dashboard identifier, and the second plurality of filter words from the virtual assistant application 90 when the alert notification object 240 is selected utilizing the second input device 41. In an exemplary embodiment, the updated textual alert words are "The Actual ST for Country Canada for FC Version DP for Year 2020 is 16,503", the intelligence dashboard identifier is "Control Tower Demo", and the second plurality of filter words are "Actual ST, Canada." The intelligence dashboard identifier "Control Tower Demo" is associated with an intelligence dashboard 400 (shown in FIGS. 9 and 10) that has information relating to the updated textual alert message 1120.

At step 714, the conversational web GUI 70 displays the updated textual alert words 1121 in the updated textual alert message 1120 in a fourth text label 254 (shown in FIG. 9) on the scrollable panel 160 below the alert notification object 240. In an exemplary embodiment, the updated textual alert words 1121 are "The Actual ST for Country Canada for FC Version DP for Year 2020 is 17,000."

At step 716, the conversational web GUI 70 determines an intelligence dashboard URL based on the intelligence dashboard identifier, and sends the intelligence dashboard URL to a dashboard analytics application 120. In an exemplary embodiment, referring to FIG. 35, the intelligence dashboard URL is "https://report_url?filterCountry eg 'Canada'", and the intelligence dashboard identifier is "Control Tower Demo." In an exemplary embodiment, the conversational web GUI 70 utilizes an internal table having a record with the fields "Control Tower Demo" and "https://report url?filterCountry cq 'Canada'" to associate these two terms with one another so that the GUI 70 can determine the dashboard URL "https://report_url?filterCountry eq 'Canada'" based on the intelligence dashboard identifier "Control Tower Demo."

At step 718, the conversational web GUI 70 receives the intelligence dashboard 400 from the dashboard analytics application 120 in response to sending the intelligence dashboard URL.

At step 730, the conversational web GUI 70 displays the intelligence dashboard 400 in an inline frame 300 on the scrollable panel 160 below the fourth text label 254. The intelligence dashboard 400 displays the information relating to the updated textual alert message 1120 and includes filter selection controls 450-466 for filtering data in the intelligence dashboard 400 to obtain more specific information related to the updated textual alert message 1120, such that sequential vertical positions of the textual alert request 800 (shown in FIG. 3), the textual alert words 1021 of the textual alert message 1020 (shown in FIG. 8), the updated textual alert words 1121 of the updated textual alert message 1120 (shown in FIG. 9), and the intelligence dashboard 400 (shown in FIG. 9) on the scrollable panel 160 correspond to a conversation between a user and the system At step 732, the intelligence dashboard 400 displays modified information related to the updated textual alert message 1120 when a first filter selection control 454 of the filter selection controls 450-466 on the intelligence dashboard 400 is selected utilizing the second input device 41.

The cloud-based system 50 provides a substantial advantage over other systems. In particular, the cloud-based system 50 utilizes a conversational web GUI 70 that obtains and displays a textual alert message 1020 (shown in FIG. 30) in response to a textual alert request 800 (shown in FIG. 19), and an updated textual alert message 1120 (shown in FIG. 35) and an intelligence dashboard 400 (shown in FIG. 10) such that sequential positions of the textual alert request 800, textual alert words 1021 of the textual alert message 1020 (shown in FIG. 8), updated textual alert words 1121 (shown in FIG. 35) of the updated textual alert message 1120, and the intelligence dashboard 400 on the scrollable panel 160 (shown in FIG. 10) correspond to or simulate a conversation between a user and the system 50.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A cloud-based system for scheduling and receiving a textual alert message and receiving an intelligence dashboard, the cloud-based system communicating with a computer having first and second user input devices, a display device, and a web browser, the cloud-based system comprising:
   a conversational web GUI being displayed on the web browser by the display device, the conversational web GUI having a text input box and a scrollable panel;
   the text input box receiving a textual alert request having an alert parameter and a threshold number from the first user input device;
   the conversational web GUI displaying the textual alert request in a first text label on the scrollable panel, and sending the textual alert request to a virtual assistant application;
   the conversational web GUI displaying a plurality of alert time interval icons below the first text label;
   the conversational web GUI receiving a selected alert time interval from one of the plurality of alert time interval icons selected by the second user input device, and sending an alert time interval message having the selected alert time interval to a task scheduler application which notifies the virtual assistant application that the selected alert time interval has been received;
   the conversational web GUI receiving the textual alert message from the task scheduler application when the selected alert time interval has passed and an alert condition based on the textual alert request is satisfied;
   the conversational web GUI displaying textual alert words from the textual alert message in an alert notification object on the scrollable panel below the plurality of alert time interval icons;
   the conversational web GUI receiving an updated textual alert message with updated textual alert words and an intelligence dashboard identifier from the virtual assistant application when the alert notification object is selected utilizing the second user input device;
   the intelligence dashboard identifier being associated with the intelligence dashboard that has information relating to the updated textual alert message;
   the conversational web GUI displaying the updated textual alert words of the updated textual alert message in a second text label on the scrollable panel below the alert notification object;
   the conversational web GUI requesting the intelligence dashboard from a dashboard analytics application based on the intelligence dashboard identifier;
   the conversational web GUI receiving the intelligence dashboard from the dashboard analytics application;
   the conversational web GUI displaying the intelligence dashboard in an inline frame on the scrollable panel below the second text label, the intelligence dashboard displaying the information relating to the updated textual alert message and includes visible filter selection controls for filtering data in the intelligence dashboard to obtain more specific information related to the updated textual alert message; and
   sequential vertical positions of the textual alert request, the textual alert words of the textual alert message, the updated textual alert words of the updated textual alert message, and the intelligence dashboard on the scrollable panel correspond to a conversation between a user and the cloud-based system.

2. The cloud-based system of claim 1, further comprising:
   an intent classifier application communicating with the virtual assistant application;
   the virtual assistant application receiving the textual alert request from the conversational web GUI and sending the textual alert request to the intent classifier application; and
   the intent classifier application generating a first intent classification identifier and a first plurality of filter words based on the textual alert request, and sending a first classification message having the first intent classification identifier, the alert parameter, and the first plurality of filter words to the virtual assistant application; the first intent classification identifier indicating an intent of the textual alert request.

3. The cloud-based system of claim 2, further comprising:
   a database operably communicating with the virtual assistant application;
   the virtual assistant application generating an alert criteria message having a first database search query command, the alert condition, and a response text; the first database search query command having a first table identifier, the first table identifier being determined based on the alert parameter; the alert condition being based on the alert parameter and at least a portion of the first plurality of filter words in the first classification message; and the virtual assistant application sending the alert criteria message to a cloud storage application which stores the alert criteria message.

4. The cloud-based system of claim 3, wherein:

the virtual assistant application sending a request alert schedule message to the conversational web GUI for an alert time interval selection; and the conversational web GUI displaying the plurality of alert time interval icons below the first text label in response to the request alert schedule message.

5. The cloud-based system of claim 4, wherein:

the conversational web GUI displaying a time interval selection message in a third text label on the scrollable panel below the first text label and above the second text label; and the conversational web GUI displaying the plurality of alert time interval icons below the third text label.

6. The cloud-based system of claim 5, wherein:

the task scheduler application sending an alert schedule status message to the virtual assistant application to notify the virtual assistant application that the selected alert time interval has been received.

7. The cloud-based system of claim 6, wherein:

the virtual assistant application sending an alert set-up confirmation message to the conversational web GUI in response to the alert schedule status message; and the conversational web GUI displaying the alert set-up confirmation message in a fourth text label on the scrollable panel below the plurality of alert time interval icons.

8. The cloud-based system of claim 5, wherein:

the task scheduler application sending an alert criteria request message to the cloud storage application at a desired time based on the selected alert time interval;

the cloud storage application sending the alert criteria message that was previously stored therein to the task scheduler application;

the task scheduler application sending the first database search query command to the database;

the database searching for a first value stored therein based on the first database search query command and returning the first value to the task scheduler application;

the task scheduler application determining that the alert condition in the alert criteria message has been satisfied utilizing the first value; and the task scheduler application sending the textual alert message to the conversational web GUI when the alert condition in the alert criteria message has been satisfied, the textual alert message having the textual alert words, a time stamp value, and a textual alert question; the textual alert question being associated with the response text in the alert criteria message.

9. The cloud-based system of claim 8, wherein:

the conversational web GUI has a notification icon thereon;

the notification icon having a number thereon that is incremented when the conversational web GUI receives the textual alert message; and the conversational web GUI displaying the textual alert words in the textual alert message in the alert notification object on the scrollable panel when the notification icon is selected utilizing the second input device.

10. The cloud-based system of claim 8, wherein:

the conversational web GUI sending the textual alert question associated with the text alert request to the virtual assistant application when the alert notification object is selected using the second input device;

the virtual assistant application receiving the textual alert question from the conversational web GUI and sending the textual alert question to the intent classifier application; and the intent classifier application generating a second intent classification identifier, the intelligence dashboard identifier, and a second plurality of filter words based on the textual alert question, and sending a second classification message having the second intent classification identifier, the intelligence dashboard identifier, and the second plurality of filter words to the virtual assistant application; the second intent classification identifier indicating an intent of the textual alert question.

11. The cloud-based system of claim 10, wherein:

the virtual assistant application generating a second database search query command having a second table identifier and a second plurality of filter words, the second table identifier being determined based on the intelligence dashboard identifier;

the virtual assistant application sending the second database search query command to the database;

the database searching for a second value stored therein based on the second database search query command and returning the second value to the virtual assistant application;

the virtual assistant application generating the updated textual alert message having updated textual alert words, the intelligence dashboard identifier, and the second plurality of filter words, the updated textual alert words being based on the second value and the textual alert request; and the virtual assistant application sending the updated textual alert message to the conversational web GUI.

12. The cloud-based system of claim 1, wherein:

the conversational web GUI determining an intelligence dashboard URL based on the intelligence dashboard identifier;

the intelligence dashboard URL being associated with the intelligence dashboard;

the conversational web GUI sending an intelligence dashboard URL message having the intelligence dashboard URL and the at least one filter word of a plurality of filter words to the dashboard analytics application; and the dashboard analytics application sending the intelligence dashboard associated with the intelligence dashboard URL that is filtered using the at least one filter word, to the conversational web GUI in response to the intelligence dashboard URL message.

* * * * *